United States Patent [19]
Lihme et al.

[11] Patent Number: 6,043,067
[45] Date of Patent: Mar. 28, 2000

[54] DISTRIBUTING LIQUID IN A FLUID BED REACTOR INTO TURBULENT AND NON-TURBULENT ZONES

[75] Inventors: Allan Otto Fog Lihme, Birkerød; Claus Schäfer Nielsen, Humlebæk; Thorkild Christian Bøg-Hansen, Hellerup, all of Denmark

[73] Assignee: Upfront Chromatography A/S, Copenhagen, Denmark

[21] Appl. No.: 09/003,830

[22] Filed: Jan. 8, 1998

Related U.S. Application Data

[62] Division of application No. 07/971,860, filed as application No. PCT/DK91/00195, Jul. 8, 1991, Pat. No. 5,935,442.

[30] Foreign Application Priority Data

Jul. 9, 1990 [DK] Denmark ................................. 1650/90

[51] Int. Cl.$^7$ ............................ C12N 11/00; C12M 1/40; C02F 1/00; B01D 15/00; C07K 1/16

[52] U.S. Cl. ........................ 435/174; 210/601; 210/632; 210/656; 210/661; 435/176; 435/178; 435/180; 435/289.1; 435/815; 436/526; 436/527; 436/529; 436/531; 530/412; 530/413; 530/811; 530/812; 530/813

[58] Field of Search ..................................... 435/174, 176, 435/177, 178, 180, 182, 289.1, 815; 210/601, 632, 656, 661; 436/526, 527, 529, 531; 530/412, 413, 811, 812, 813

[56] References Cited

U.S. PATENT DOCUMENTS

| | | | |
|---|---|---|---|
| 2,797,201 | 6/1957 | Veatch et al. .............................. | 521/57 |
| 4,032,407 | 6/1977 | Scott et al. ................................ | 435/177 |
| 4,054,631 | 10/1977 | Mori et al. ................................ | 264/117 |
| 4,110,164 | 8/1978 | Sutthoff et al. ........................... | 195/63 |
| 4,142,969 | 3/1979 | Funk et al. ................................ | 210/680 |
| 4,143,201 | 3/1979 | Miyashiro et al. ...................... | 428/403 |
| 4,241,176 | 12/1980 | Avrameas et al. ......................... | 435/7 |
| 4,675,113 | 6/1987 | Graves et al. ........................... | 210/635 |
| 4,698,317 | 10/1987 | Inoue et al. ............................... | 501/9 |

FOREIGN PATENT DOCUMENTS

| | | |
|---|---|---|
| 0 007 783 | 2/1980 | European Pat. Off. . |
| 0 021 267 | 1/1981 | European Pat. Off. . |
| 0 021 563 | 1/1981 | European Pat. Off. . |
| 0 025 309 | 1/1981 | European Pat. Off. . |
| 0 005 650 | 3/1983 | European Pat. Off. . |
| 0 074 221 | 3/1983 | European Pat. Off. . |
| 0 088 404 | 9/1983 | European Pat. Off. . |
| 0 175 568 | 3/1986 | European Pat. Off. . |
| 0 266 580 | 5/1988 | European Pat. Off. . |
| 397 669 | 11/1997 | Sweden . |
| 2 151 601 | 7/1985 | United Kingdom . |
| 2 196 252 | 4/1988 | United Kingdom . |
| 81/02844 | 10/1981 | WIPO . |
| 87/07851 | 11/1987 | WIPO . |
| 90/14157 | 11/1990 | WIPO . |

OTHER PUBLICATIONS

Chemical Abstract 82, 98:157436t, Polymer–Coated Supports for use as Selective . . . , Kuraray Co., Ltd.

Chemical Abstract 82, 111:74363c, Stationary Phases for Columns Chromotography, Sakuma et al.

Patent Abstracts of Japan, vol. 8, No. 162, C235, Abstract of JP 59–62339, published Sep. 4, 1984.

Dialog Information Services, File 351, World Patent Index 81–91, Dialog Accession No. 89–097988/13 Nippon Steel Chem KK, "Medium for Culture of Plants . . . ", JP 1047320, A, 890221, 8913 (Basic).

Journal of Chromatography, vol. 128 (1976) pp. 125–131, Elsevier Scientific Publishing Company, Amsterdam, "Preparation of Silica–Agarose Beads for Gel Chromatography", Hakan Pertoft and Anund Hallen.

J. Chem. Tech. Biotechnol. 1987, vol. 40, pp. 33–40, "Aerosol–jet Produced, Magnetic Carrageenan–gel Particles: A New Affinity Chromatography Matrix", Charles H. Lochmuller, Larry S. Wigman & Barbara S. Kitchell.

Separations for Biotechnology, Ellis Horwood Limited, Chichester, West Sussex, England, 1987, Chapt. 13, pp. 194–199, "Macrosorb kieselguhragarose composite adsorbents: new tools for downstream process design and scale–up", Bite, Berezenko & Reed.

*Primary Examiner*—David M. Naff
*Attorney, Agent, or Firm*—Finnegan, Henderson, Farabow, Garrett & Dunner, L.L.P.

[57] ABSTRACT

In a vertical down-flow fluid bed reactor, suspended particles in liquid proximal to an inlet in an uppermost part of the reactor are agitated to form a downward extending turbulent zone having vigorously moving particles and a non-turbulent zone distal to the inlet having essentially stationary particles in liquid below and adjoining the turbulent zone. In a vertical up-flow fluid bed reactor, an upward extending turbulent zone is formed proximal to an inlet in a lowermost part of the reactor and the non-turbulent zone is above the turbulent zone. The downward or upward extend of the turbulent zone is determined by the degree of agitation. The particles may contain an active substance and be in the form of a conglomerate of base particles having a desired density to control floatation or sedimentation. Particles in the turbulent and non-turbulent zones may be different such as having different specific gravities. Liquid in the reactor may contain an enzyme or microorganism to be immobilized on the particles, or a protein to be purified by binding to the particles. Waste water may be treated in the reactor with particles containing an immobilized enzyme or microorganism, or with ion exchange conglomerate particles.

23 Claims, 8 Drawing Sheets ical Field

The invention relates to a conglomerate of controlled relative density for containing or carrying at least one active substance to be used in a fluid; methods of preparing such a conglomerate; and the use of such a conglomerate as a solid phase matrix, carrier, or substrate material in a fluid bed rector, or in a batch reactor; as a carrier of substances for sustained release; as a food material, medical, and vaccine for fish, or other animals living in water; as a material for treating waste water and polluted waters; and as a material for treating polluted water such as oil polluted sea water.

Further, the invention relates to a method of distributing a fluid in the fluid bed of a fluid bed reactor; and a fluid bed reactor using such a method.

In the present context the expression "conglomerate" is intended to designate a composite of basic particles, which may comprise particles of different types and sizes, held together by conglomerating agents. Conglomerates may be of various sizes, and shapes and should preferably exhibit various degrees of mechanical rigidity depending on the application. Further, conglomerates may be chemically active or may be chemically inactive under the conditions applied.

The expression "conglomerate of controlled relative density" is intended to designate a conglomerate or a conglomerate particle for which in particular the basic particles are chosen in predetermined amounts to provide a certain relative density of the conglomerate with respect to the fluid in which an active substance or another constituent of the conglomerate is to be used so that the floatability or sedimentation, respectively, is controlled. Thus, conglomerates according to the invention are intentionally designed with respect to the density of the medium for their particular purpose of application, including proper consideration of the influence of their sizes on their floating or sedimentation properties. In other media, e.g. during preparation or during storage under e.g. dry conditions, the conglomerate may have a density different from than that in the fluid medium of use, such fluids may be liquids or gases.

In the present context the expression "active substance" should be taken in a very broad sense comprising agents having desired properties for their particular purpose of application, e.g adsorbents, ligands, reagents, enzymes, catalysts; natural substances and substrates, cell aggregates; or nutritional matter for animals living in water; entrapped in or chemically, e.g. covalently, ionically, photochemically, etc. bound to the conglomerate of controlled density.

Carrier materials for carrying at least one active substance are used in a wide variety of applications in chemical and biological processes, such as production and manufacturing of chemical or pharmaceutical products, e.g. for carrying catalysts in liquid phase oil conversion technology, for carrying enzymes for modifying synthetical products, e.g. enzymes such as proteases, invertases, amidases and ring forming enzymes for synthesis of lactones, and carboxypeptidase for synthesis of peptides using solid-phase techniques; fermentation and cell growth, e.g. for carrying cells or substrate; waste water purification, e.g. for carrying enzymes and/or microorganisms, catalysts or adsorbents; chromatographic processes, e.g. high performance liquid chromatography, gel filtration, ion exchange and affinity chromatography, e.g for carrying adsorbents; diagnostic processes, e.g. for carrying adsorbents for blood purification, dyechromatographic processes for albumine purification; and prophylactic processes, e.g. for carrying immobilized antibodies or antigens in extracorporael circulations for removal of antigens or antibodies, bacterial toxins or other toxins, and autoimmune diseases.

Prior Art Disclosure

There are numerous disclosures in the prior art concerning particles prepared from organic and inorganic materials. However, carriers comprising conglomerates of controlled relative density with respect to the fluid of use carrying or for carrying at least one active substance have apparently never been disclosed.

Kuraray Co., Ltd., C.A. 98: 157436t discloses beads, particles, fibres, sheets, and tubes of glass, activated carbon, silica, alumina or high molecular weight substances coated with copolymers of acrylates and carboxylic acids or amines to form selective adsorbent carriers or supports for use in selective electrodes or in column chromatography.

Sakuma et al., C.A. 111: 74363c, disclose glass or polymer spheres coated with hydroxyapatite for use as a stationary phase for column chromatography.

EP-A-0266580 discloses a method for coating solid particles with a hydrophilic gel preferably agarose for various separating processes in packed columns based on adsorbent groups, e.g. ion exchanging groups, hydrophobic groups, or groups with biospecificity chemically bound to a gel. Such coating may be provided by mixing hydrophilic solid particles with a gel-forming substance above the gelling temperature in which each individual particle is coated, separated from each other, and cooled below the gelling temperature, essentially to stabilize the particles against the high pressure in e.g. HPLC applications.

Generally, all of the above mentioned coated particles are provided by coating individual particles made of the same material and having the same density.

U.S. Pat. No. 4,698,317 discloses hollow microspherical glass particles having open pores, and being prepared by spray thermal decomposition of a solution, in an aqueous organic solvent, wherein the water content promotes open pore formation.

U.S. Pat. No. 2,797,201 discloses substantially spherical, hollow particles having a "thin, strong skin" being prepared by thermal treatment of droplets of a solution of a film forming material, e.g. an organic polymer such as a phenol-formaldehyde resin, and optionally further containing a "blowing agent", i.e an agent generating gas at the elevated temperature of the thermal treatment.

GB 2151601B discloses porous hollow particles of an inorganic material and a composite material comprising such particles supporting a selected substance such as a chromatographic organic gel. The porous hollow particles may be formed by coating a fugitive core material, e.g. organic resin beads or alginate spheres, with inorganic material, and then heating to remove the fugitive core material. Further, GB 2151602B discloses closely similar particles wherein a magnetic material, such as ferric oxide, nickel oxid or cobalt oxide, is incorporated in the inorganic shell of the particle.

The 3M Corporation (USA) markets a number of types of substantially impermeable, hollow micro-spheres of silicious material. For example synthetically manufactured soda-lime borosilicate glass micro-spheres marketed by 3M in a variety of size fractions. Also, permeable hollow spheres of siliceous material derived from fly-ash are provided by Fillite Ltd., Runcorn, England. However, none of the commercially available micro-spheres are conglomerates of controlled relative density according to the invention.

EP-A-0021563 discloses a material suitable for thermosetting which includes a collection of hollow particles adhesively mixed with a thermosetting resin and which material may be converted by thermosetting in to a fused solid mass having a density not greater than 0.5 g/cm$^3$.

GB-A-2196252 discloses an oral, solid, pharmaceutical dosage form comprising conventional matrix binders including starch and cellulose, or their derivatives, and a pharmaceutically acceptable weighting agent, including inorganic compounds such as salts, oxides, or hydroxides of a metal, e.g. barium sulphate or ferrous oxide, suitable for oral administration to humans and for controlled release of a pharmaceutically active ingredient into the stomach. The controlled release unit may have any chosen density from about 2 g/ml to about 6 g/ml and may in case of a conventional pellet have a size from about 1 to about 1.4 mm, and in case of a tablet a size above 10 mm. Nothing is disclosed nor suggested about non-solid i.e. permeable or porous conglomerates of controlled relative density according to the invention. Furthermore, the described pharmaceutical dosage form consists of solid particles comprising a binder and a weighting agent soluble in gastic fluid which makes the pellet or tablet disintegrate shortly after ingestion.

Generally, for a large number of applications, the active substance to be used in a fluid may only temporarily be available or accessible at the right places in the fluid. Thus, for inert carrier particles carrying active substances and often showing large variations in dispersion properties, e.g. sedimention or floatation, the active substances may be carried in an uncontrolled manner e.g. down- or upwards in relation to the fluid depending on the relative density of the carrier.

In fluid bed reactors partially solving the problems of packed bed columns, i.e the problems of suspended matter clogging up the solid-phase bed which increases the back pressures and compresses the bed disturbing the flow through the bed, the carrier particles are carrying the active substance in a free, fluid phase by applying a flow having an opposite direction to the direction of the relative movement of the carrier. Thus, carrier particles having a density larger than the fluid and moving downwards due to gravity may be kept in a free, fluid phase by an upwards flow of fluid. Also, carrier particles having a density less than the fluid and thus moving upwards may due to buoyancy be kept free, fluid phase by a downwards flow of fluid.

For fluid bed solid-phase chemical processes, the density of the solid-phase carrier particle is very important in controlling bed properties. However, up to now, the design of solid-phase carrier particles has been limited by the available material.

Generally, particles may either be designed to be impermeable to the fluid, in which case the available surface area per unit volume is small; or particles may be designed to be permeable to the fluid, in which case the material chosen has to have the correct density per se. Unfortunately, the most interesting materials for many applications, e.g. materials such as natural and synthetic polysaccharides like agar, alginates, carrageenans, agarose, dextran, modified starches, and celluloses; synthetic organic polymers and copolymers typically based on acrylic monomers used for chromatographic purification of proteins in packed bed columns are not of suitable density per se. Therefore, these materials are difficult to apply in fluid bed reactors.

However, certain types of organic polymers and certain types of silica based materials may be produced to provide carrier particles of suitable density, but such carriers may not at the same time be suitable active substances, e.g. for protein purification procedures, where such materials may provide low permeability, non-specific interactions and denature bound proteins. Further, for such polymers, it may be difficult and expensive to design derivatisation schemes for affinity chromatography media. Also, certain types of permeable silica particles have been used for fluid bed applications. However, the properties of these materials are far from optimal. Thus, the materials are instable at pH above 7, fragile to shear forces, and provide non-specific interactions.

U.S. Pat. No. 4,032,407 discloses a tapered bed bioreactor applying immobilized biological catalysts or enzymatic systems on fluidizable particulate support materials consisting of coal, alumina, sand, and glass, i.e. materials heavier than the fluid.

EP-A-0175568 discloses a three phase fluidized bed bioreactor process comprising purifying effluents in a three phase fluidized bed comprising solid particles being made by mixing a binder with an inorganic materiel based on aluminum silicate, granulating the resulting mixture, and firing the granules to sinter them. The specific gravity of the sintered granules is adjusted to fall into a specific range from 1.2 to 2.0 by varying the mixing ratio of inorganic powdery materials based on aluminum and binders, said sintered granules having a diameter from 0.1 to 5 mm.

EP-A-0025309 discloses a downflow fluid bed bioreactor applying biota attached to carrier particles consisting of cork, wood, plastic particles, hollow glass beads or other light weight material and having a specific gravity which is less than that of a liquid sprayed onto the upper part of a fluid bed of suspended carrier particles and conducted downward through the bed.

These three disclosures describe particulate support materials to which the attachment of the active substance is restricted to the surface of the particles limiting the amount of active substance to be obtained per unit volume compared to particles allowing the active substance to be attached within the particle. Thus, in many applications, it is important to have specifically designed particles able to carry as large an amount of active substance per unit volume as possible which particles are not available in the prior art.

Thus, in great many applications of active substances in fluids, there is a need for materials of controlled relative density carrying or for carrying active substances in the fluids.

Further, a disadvantage is that the fluid is distributed in the fluid bed of a fluid bed reactor by spraying whereby channels are formed in the bed by the impinging fluid rays.

International Application Publication No. WO81/02844 discloses a multi-layered filter medium comprising particles formed of hollow silica beads distributed in a matrix of cured cement having a uniform specific gravity in the range from 1.02 to about 1.5; said particles being adapted for use as sucessive layers in a deep bed filter to promote agitation and scrubbing of the particles and to separate the particles more efficiently during backwash, i.e. for a use which does not involve an active substance. The particles are prepared by casting a slurry of hollow silica beads dispersed in a binder material such as cement; curing the casted slurry to a self-sustaining state; and cutting the cured casted slurry into polygonal granules; said granules then being completely cured. nothing is indicated or suggested about using an organic binder material, and providing the granules with an active substance.

EP-A-0005650 discloses an up-flow fluid bed reactor having fluidizing fluid flow distributors at the bottom thereof providing flow paths to avoid turbulens effects. Besides requiring complicated flow paths, a disadvantage of such a distributor is that it may be clogged by particulate matter.

U.S. Pat. No. 4,142,969 discloses an oleospecific hydrophobic composition comprising an intimate mixture of expanded volcanic glass consisting of perlite, a cellulose fiber, and a water repellent sizing consisting of asphalt; and a method of sorbing oleaginous compounds e.g. in selectively removing oil from the surface of water. The constituents are incorporated into a homogeneous product by a wet process, dried in an oven until essentially all moisture has been removed, and then ground up into a fluffy low density material. Nothing is disclosed nor suggeted about controlling the density of the composition by incorporation of high or low density particles.

SUMMARY OF THE INVENTION (a) Conglomerates

It is the object of the present invention to provide a conglomerate for carrying or carrying at least one active substance to be used in a fluid and having a controlled relative density with respect to the fluid.

Particularly, it is the object of the present invention to provide such a conglomerate which avoids the disadvantages of known carrier materials, e.g. the problems of uncontrolled sedimentation or floatation of active substance and/or its carrier, the poor selectivity and capacity of carriers having immobilised active substances, and the missing possibilities of simultaneously designing and controlling the properties of the active substance and carrier.

According to the invention this is fulfilled by providing a conglomerate having controlled relative density for containing or carrying at least one active substance to be used in a fluid, characterized in that it comprises predetermined amounts of:

a) basic particles selected from the group consisting of low density particles having a density providing floatation and high density particles having a density providing sedimentation of the conglomerate in said fluid;

said basic particles being dispersed in b) a matrix formed by consolidating at least one conglomerating agent selected from the group consisting of natural and synthetic organic monomers and polymers; and c) optionally at least one active substance bound to, entrapped in, carried or constituted by said matrix.

It surprisingly turns out by providing a conglomerate comprising a) basic particles selected from the group consisting of low density particles having a density providing floatation and high density particles having a density providing sedimentation of the conglomerate in said fluid;

said basic particles being dispersed in b) a matrix formed by consolidating at least one conglomerating agent selected from the group consisting of natural and synthetic organic monomers and polymers; and all constituents in suitable predetermined amounts, that it is ensured that the relative density of the conglomerate can be controlled within suitable limits for the application in the fluid where it is to be used.

Further, providing the conglomerate with optionally at least one active substance bound to, entrapped in, carried or constituted by said matrix, it is ensured that the conglomerate is or it can be provided with a desired properties such as chemical or biological selectivity or capacity. Also, it is ensured that both the properties of the active substance and the conglomerate can be controlled simultaneously.

Particularly, a conglomerate not comprising the active substance as such may be prepared separately in order to provide a material of controlled relative density which can be treated to comprise the active substance.

Conglomerates may further comprise other substances such as additives, fillings, softeners, etc., and may be designed to e.g. controlled release (also known as sustained release, slow release or "retard" release) of a desired substance from a conglomerate depending on the choice of conglomerating agent, and possibly comprising a suitable surface coating, e.g. of a material such as the ones mentioned for the conglomerating agent, having diffusion or permeability characteristics appropriate to the gradual release of the substance in question from the conglomerate.

In its broadest aspect the density may be controlled by selecting basic particles from a group of particles consisting of particles of very low density providing floatation of the conglomerate, particularly hollow and impermeable particles having shells of suitable material and properties, however, non-hollow particles may be chosen when appropriate; and particles of very high density, e.g. particles based on suitable heavy elements or compounds providing sedimentation of the conglomerate.

Generally, the invention provides a new type of carrier particles comprising conglomerates of controlled relative density, selectivity, and capacity in terms of controllable interior surface areas and materials e.g. materials having specific chemical and/or mechanical properties. Thus, compared with known carrier particles for fluid and packed bed reactors, conglomerates according to the invention can surprisingly be designed to have a number of advantages not previously obtained.

Conglomerates according to the invention e.g. in form of carrier particles can be designed to have a controlled relative density independent of the active substances and the conglomerating agents; heavy particles can be made light, and vice versa, within a wide range of particle sizes; the density can be controlled within very broad limits, e.g. the density of a known material can be controlled for a specific application; the volume percentage of the conglomerating agent can be controlled according to the application; the total size of the final carrier particle can be controlled contrary to known particles having uncontrollable sizes for specific densities suitable for particular rising and falling velocities; further, conglomerates according to the invention have a relative larger capacity, i.e. a larger accessible volume, compared to e.g known impermeable carrier particles; also, in prepacing such known impermeable carrier particles, the active substances to be applied are limited, e.g. limited to substances that can be attached to the particle surface. However, for conglomerates, both the impermeable carrier particles and the active substances may be included, e.g. in form of entrapped particles or substances.

Also, contrary to known particles having a given mechanical strength and density, the elasticity and the mechanical strength of a conglomerate can be controlled independent of the density. Further, pore sizes and e.g. biocompatibility can be controlled independently of the density in order to allow access to the interior of the conglomerate and to avoid denaturation e.g. of proteins.

(b) Methods of Preparation

Preparation of conglomerates according to the invention may be obtained by various methods known per se, e.g. block polymerisation of monomers; suspension polymerisation of monomers; block or suspension gelation of gelforming materials, e.g by heating and cooling (e.g. of agarose) or by addition of gelation "catalysts" (e.g. adding a suitable metalion to alginates or carrageenans); block or suspension cross-linking of suitable soluble materials (e.g. cross-linking of dextrans, celluloses, starches or gelatines, or other organic polymers with e.g. epichlorohydrine or divinyl sulfon); formation of silica polymers by acidification of silica solutions (e.g. block or suspension solutions); mixed procedures e.g. polymerisation and gelation; spraying procedures; and fluid bed coating of basic particles.

Thus, for particularly preferred embodiments according to the inventions conglomerates may be obtained by cooling emulsions of basic particles suspended in congldmeratinig agents in heated oil solvents; or by suspending basic particles and active substance in a suitable momoner or copolymer solution followed by polymerisation.

"Preparation by Gelation/Polymerisation in the Emulsified State"

In another aspect the invention provides a method of preparing a conglomerate according to the invention, comprising a) mixing basic particles selected from the group consisting of low density particles having a density providing floatation, and high density particles having a density providing sedimentation of the conglomerate in the fluid, said particles preferably impermeable to the fluid, at least one conglomerating agent made of a material consisting of natural and synthetic organic monomers and/or polymers selected from the group consisting of:
  i) natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses celluloses, pectins, mucins, dextrans, starches, heparins, gelatins, chitosans, hydroxy starches, hydroxypropyl starches, carboxymethyl starches, hydroxyethyl celluloses, hydroxypropyl celluloses, and carboxymethyl celluloses;
  ii) synthetic organic polymers and monomers resulting in polymers, including acrylic polymers, polyamides, polyimides, polyesters, polyethers, polymeric vinyl compounds, polyalkenes, and substituted derivatives thereof, as well as copolymers comprising more than one such organic polymer functionality, and substituted derivatives thereof; and
  iii) mixtures of these;
said active substance, if present, in prederterminded amounts optionally heated;

b) emulsifying said mixture in a suitable solvent;

c) consolidating said conglomerating agent by a suitable means such as gelation by heating/cooling, polymerisation of mononier or iiionomer mixtures, non-covalent or covalent cross-bonding; and d) isolating and washing of the conglomerate.

"Preparation by Gelation/Polymerisation in the Block State"

In still another aspect, the invention provides a method of preparing a conglomerate according to the invention, comprising a) mixing basic particles selected from the group consisting of low density particles having a density providing floatation, and high density particles having a density providing sedimentation of the conglomerate in the fluid, said particles preferably impermeable to the fluid, at least one conglomerating agent made of a material consieting of natural and synthetic organic monomers and/or polymers selected from the group consisting of:
  i) natural and synthetic polysaccharides and other carbohydrete based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, gelatins, chitosans, hydroxy starches, hydroxypropyl starches, carboxymethyl starches, hydroxyethyl celluloses, hydroxypropyl celluloses, and carboxymethyl celluloses;
  ii) synthetic organic polymers and monomers resulting in polymers, including acrylic polymers, polyamides, polyimides, polyesters, polyethers, polymeric vinyl compounds, polyalkenes, and substituted derivatives thereof, as well as copolymers comprising more than one such organic polymer functionality, and substituted derivatives thereof; and
  iii) mixtures of these;
said active substance, if present, in predetermined amounts in a solvent; and b) consolidating said conglomerating agent by a suitable means such as gelation by heating/cooling, polymerisation of monomer or monomer mixtures, non-covalent or covalent cross-bonding; and c) disintegrating the block of conglomerate; and d) segregating the particles, and washing the segregated conglomerate.

Thus, e.g. for polysaccharides such as agarose and agar, i.e. materials melting at high temperatures and solidifying at low temperatures, the conglomeratiflg means is by heating/cooling. Further, for acryl derivatives and other monomers or mixtures of these, the congiomerating means can be selected from a group consisting of:

a) addition of polymerisation catalyst;

b) heating;

c) illumination with light; and d) irradiation with ionizing radiation.

Particularly for heavily charged polysaccharides and polymers such as alginates and carrageenans, the conglomerating means is non-covalent cross-bonding by addition of a suitable metal ion. However, for polysaccharides in general, e.g. cellulose and its derivatives, and polymers containing e.g. amino, hydroxyl, thiol, and carboxy groups, the conglomerating means is covalent cross-bonding by addition of a suitable cross-bonding agent, e.g. epichlorohydrine, divinyl sulfon, bisepoxyranes, dibromopropanol, glutaric dialdehyde, diamines, and other bifunctional agents.

Also, the above mentioned conglomerating means may be combined in specific cases such as the preparation of conglomerates of agaroseacryl-derivatives and cross-bonded mixtures of agarose and dextran.

Further, in the above mentioned block polymerisation, the segregation step of the polymer block may be obtained by methods known per se, e.g. by granulation and sieving.

(c) The Use of Conglomerates

"Solid Phase Matrix, Carriers, or Substrate Materials"

The invention also related to the use of conglomerates according to the invention as a solid phase matrix, carrier, or substrate material in a procedure selected from the group consisting of:

chromatographic procedures applying non-packed columns including liquid chromatography, ion-exchange chromatography, and biospecific affinity chromatography such as immunosorption and protein A chromatography, and group specific affinity chromatography such as hydrophobic, thiophilic, dye, lectin, and metal chelate chromatography;

filtration of a fluid medium;

adsorption of at least one selected substance present in a fluid medium;

heterogeneous catalysis of a reaction taking place in a fluid medium;

immunochemical procedures, including immunosorbtion;

solid-phase synthesis, including solid-phase peptide and protein synthesis, and solid-phase oligonucleotide synthesis;

microbiological procedures;

enzyme reactor procedures;

carriage, on the outer or the interior surface of the particles, optionally after & suitable surface treatment of live cells selected from cells of human, animal, plant, fungal and microorganism origin.

Examples of Enzyme Reactor Procedures are:

(i) "confinement immobolization" procedures making use of an enzyme (e.g. in the form of an enzyme solution) which is contained within the through-going pores and/or internal cavities of a permeable conglomerate, and which is prevented, as described earlier, above, from escaping from the conglomerate by the presence of a suitable surface coating having diffusion or permeability characteristics such that the desired enzyme substrate(s) and resulting reaction product(s) may migrate through the coating;

(ii) "solid-phase covalent immobilization" procedures making use of an enzyme which is covalently bound, via appropriate functionalities, within the conglomerate, the resulting conglomerate optionally being subjected to a surfae treatment to provided a coating of the type mentioned in (i) above.

Such procedures might be employed, for example, in the production of high-fructose syrups from sucrose molasses, using a permeable conglomerate containing a suitable "confinement immobilized" or "solid-phase covalently immobilized" sucrase.

"Fluid Bed Reactors"

Generally, a fluid bed reactor may comprise a vertical reactor with an inlet, an outlet, a fluid bed of particles, and a fluid. The fluid is introduced at the inlet and dispersed, optionally through a gas head in case of down-flow reactors, on the bed of particles which are suspended and fluidized by the fluid. The fluid it conducted through the bed and a pool of reacted and/or unreacted fluid is let out at the outlet.

Down-flow fluid bed reactors have fluid inlet at the top of the reactor and fluid bed particles of specific gravity less than that of the fluid.

Up-flow fluid reactors have fluid inlet at the bottom of the reactor and fluid bed particles of specific gravity larger than that of the fluid.

The suspended particles may be reactive or may carry immobilized reactive components selected for solid phase chemical or physical processes with one or more components of the fluid in procedures such as enzymatic reactions; fermentation; ion-exchange and affinity chromatography; filtration; adsorption, catalysis; immunosorption; solid-phase peptide and protein synthesis; and microbiological growth if microorganisms.

It is an object of the invention to provide the use of conglomerates according to the invention in solid-phase chemical processes such as heterogeneous chemical reactions in continuous fluid bed reactors particularly for separation of proteins.

This is fulfilled by providing the use of a conglomerate or particles of a conglomerate according to the invention, or a conglomerate prepared by a method of preparing a conglomerate according to the invention, as a solid phase matrix, carrier, or substrate material in a fluid bed reactor.

"Distribution of Fluid in the Fluid Bed of a Fluid Bed Reactor"

Generally, in carrying out solid phase chemical or physical processes in a fluid bed reactor, it is desired to have an even and smooth distribution of fluid in the fluid bed.

To provide this, it is known to use a fluid flow distribution by means of a distribution plate which, however, does not avoid the formation of channels in the fluid bed, jsut as unwanted turbulence occurs.

According to the invention, it has surprisingly turned out that agitation of the part of the fluid bed proximal to the inlet of the fluid divides the fluid bed into i) an agitated zone having vigorously moving particles; and ii) a non-agitated zone;

said non-agitated zone adjoining said agitated zone in a sharp interface across which there is an even distribution of fluid flowing into the non-agitated zone with minimal or no turbulence.

Further, it is obtained that unwanted mixing of products and reactants, and unwanted wear of the bed particles are reduced.

Therefore, in another aspect, it is the object of the present invention to provide a method of distributing a fluid in the fluid bed of a fluid bed reactor such that the fluid is distributed evenly with minimal or no turbulence in the fluid bed.

According to the invention, there is provided a method of distributing a fluid in the fluid bed of a down-flow fluid bed reactor comprising a vertical reactor with an inlet, an outlet, and a fluid bed of particles, wherein a) the particles and fluid proximal to the fluid inlet are agitated to divide the fluid bed into i) an agitated zone having vigorously moving particles, and ii) a non-agitated zone;

said non-agitated zone adjoining said agitated zone; and b) the extent of said agitated zone is determined by a degree of of agitation selected within a range from i) a degree of agitation providing agitation only in the uppermost part of the fluid bed, ii) to a degree of agitation providing agitation of the particles throughout the fluid bed.

Also, for chromatographic applications, the dispersion of eluant is reduced, i.e. the width of the elution band is reduced. Also, for enzymatic and fermentation type reactions, enzyme inhibition is reduced as the intermixing of products and substrates is reduced. Further, formation of channels in the fluid bed is minimized.

The invention provides a similar method for an up-flow fluid bed reactor in which the extent of the agitated zone is determined by the sedimentation of the fluid bed particles instead of the buoyancy of the particles as in case of the down-flow fluid bed reactor.

In a particularly preferred embodiment, the invention provides such method of distribution a fluid in the fluid bed of a fluid bed reactor wherein the particles consists of a conglomerate according to the invention.

The position of the sharp interface is controlled by the degree of agitation which is selected for a given flow of fluid, viscosity, and buoyance/sedimentation of the particles.

Agitation can be effected by any agitation means, including mechanical agitation mean or gas injection mean. In case of mechanical agitation means, it is preferred that the agitation is provided by stirring with a mechanical stirrer which does not form a vortex in the fluid.

Fluid bed particles can be different or of the same type for both the agitated zone and the non-agitated zone.

In a preferred embodiment, the agitated zone may comprise inert particles of slightly different specific gravity than the particles of the non-agitated zone. In this case, the inert particles positioned in the agitation zone solely participate in the distribution of fluid in the fluid bed, and not in the solid phase processes. These processes take place in the non-agitated zone by specifically designed particles having both controlled density and controlled chemical reactivity, capacity, etc.

It is further the object of the present invention to provide a fluid bed reactor using such a method of distributing the fluid in the fluid bed.

According to the invention, there is provided a down-flow fluid bed reactor comprising a vertical reactor vessel with an inlet, an outlet, a fluid bed of particles, and agitation means, characterized in that the agitation means is located near or in the fluid bed proximal to the fluid inlet.

Also, according to the invention, there is provided an up-flow fluid bed reactor comprising a vertical reactor vessel with an inlet, an outlet, a fluid bed of particles, and agitation means, characterized in that the agitation means is located near or in the fluid bed proximal to the fluid inlet.

In a preferred embodiment, both down-flow and up-flow fluid bed reactors comprise a fluid bed the particles of which consist of a conglomerate according to the invention.

Generally, compared to packed bed techniques, fluid bed techniques, e.g. to be used in fluid bed chromatography, are better suitable to large scale primary purification of proteins as the steps of centrifugation and filtration can be avoided. Thus, the fluid bed techniques can be used immediately following the production of the protein, e.g. directly applying the produced extract or fermentation fluid to fluid bed purification and conversion. Accordingly, using conglomerates according to the invention in fluid bed techniques, several advantages such as the control of the density, and the choice of materials to design the chemical and/or mechanical properties of the carrier particles, e.g. including cheaper basic materials, are obtained.

"Batch Reactors"

Another common way of performing solid phase reactions e.g. adsorption of, at least one selected substance from a fluid medium in non-packed columns is by the way of adsorption in a batch reactor or batch column e.g. a simple vessel wherein the conglomerate particles are mixed with the liquid in a one-step procedure.

In another aspect, the invention provides the use of a conglomerate or particles of a conglomerate according to the invention, or a conglomerate prepared by a method of preparing a conglomerate according to the invention, as a solid phase matrix, carrier, or substrate material in a batch reactor.

Thus, an enhanced speed of separation of conglomerate particles in a batch reactor process can be obtained by choosing an optimally controlled relative density of the particles.

A particularly preferred way of separating the conglomerate particles is to pump the liquid containing the particles through a particle collection vessel which traps the particles e.g. by letting the particles with relative low density float up-wards in the vessel and letting the liquid flow through.

"Carriers of Substances for Sustained Release"

In another aspect the invention provides conglomerates of controlled relative density to be used for sustained release of a desired substance from a conglomerate depending on the choice of conglomerating agent and specific application. Thus such conglomerates may comprise a suitable surface coating, e.g. of a material such as the ones mentioned for the conglomerating agent. Further, the conglomerates have diffusion or permeability characteristics appropriate to the gradual release of the substance in question.

"Carriers of Substances for Animals Living in Water"

In still other aspects the invention provides conglomerates of controlled relative density to be used in foods, medicals, and vaccines for fish, or other animals living in water, which substances may be administered most efficiently if they do not sediment on the bottom, where they may be lost or eaten by other animals.

"Carriers of Substances for Waste Water Treatment"

In still another aspect the invention provides conglomerates of controlled relative density for waste water treatment materials, wherein the active substance is a microbial cell, an enzyme, a catalyst or another treatment material purifying or at least partly purifying the water. Floating particles comprising waste water treatment material may have the advantage of oxygen being available for e.g. microorganisms growing in the interior of the conglomerate.

"Carriers of Substances for Treating Oil Polluted Waters"

In still another aspect the invention provides conglomerates of controlled relative density for treating oil polluted waters, wherein the active substance is a microbial cell capable of breaking down and feed on oil, or is a catalyst for breaking down oil and oil emulsions. The active substance may also comprise materials suitable for selective hydrofobic adsorption of oil, such as certain type of surface treated perlite. Thus, conglomerates for treating oil pollution may have the advantage of being designed to be in close contact with the oil or the oil emulsions at the water surface, e.g. confined within a certain area of the surface by means of pontoons.

BRIEF DESCRIPTION OF THE DRAWINGS

The present invention is further illustrated by reference to the examples given below and to FIG. 1–7, wherein.

Figure 1A:
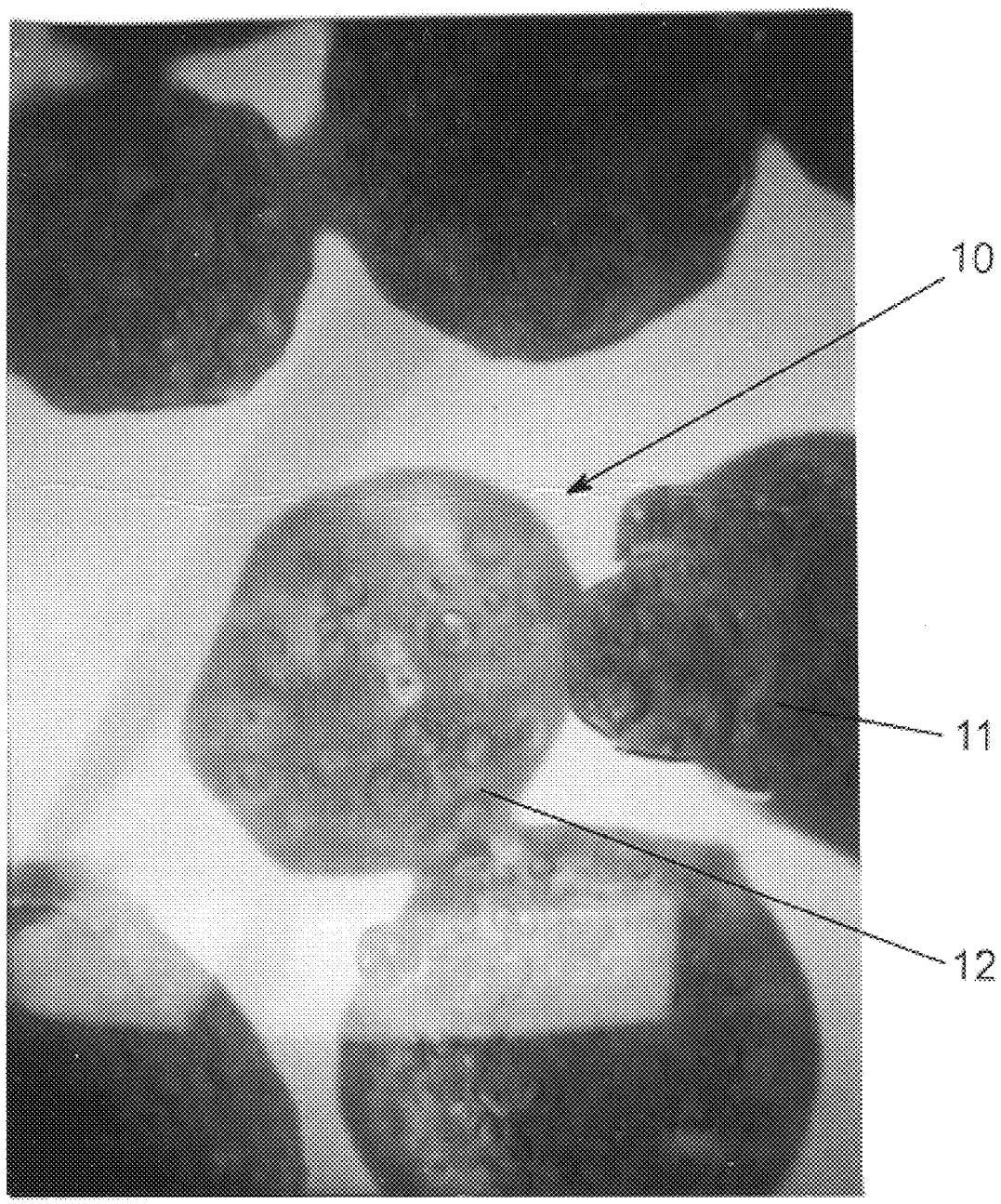
FIG. 1A shows a 40× amplified Photograph of conglomerates of agarose and glass spheres prepared according to Example 1(a)

DETAILED DESCRIPTION OF THE INVENTION (a) Controlled Relative Density of Conglomerates Within the present context the expression "relative density of conglomerates" designates the density of the individual conglomerate particles in the wet state, i.e. a state where the conglomerating agent is fully hydrated, but without any interstitial liquid between individual conglomerate particles. This means that the liquid in which the conglomerate particles are used are determinant for the density of the conglomerate particles in as much as this liquid penetrates into the volume of the conglomerating agent, solvates this and fill out the pores.

Further, the expression "relative density of the particles" designates the density of the particles relative to the density of the liquid in which the particles are to be used. This relative density is determinant for the tendency of the particles to float or to sediment in a given liquid. The relative density of conglomerate particles according to the invention is thus dependent on the solvated density of the conglomerating agent, the concentration of conglomerating agent, the density of the basic particles (preferably impermeable to the liquid and substantially non-solvated) used to regulate the density and the concentration of these.

The density of the solvated phase, i.e. the volume occupied by the conglomerating agent and the active substance will usually be dependent on the specific application of the particles and thus not allowable to be regulated by variation of the concentration of conglomerating agent. Therefore, according to the invention the density of the conglomerate particles is regulated by the addition of basic particles having a density free of choice with respect to the functionality of the conglomerate and also having a final concentration in the conglomerate free of choice with respect to the functionality, i.e. the functionality of the active principle within the volume of the conglomerating agent is not disturbed by the density and concentration of the basic particles.

A crude estimate of the final density as a function of the concentration of basic particles can be found by the following equation:

Density of conglomerate=$((d_c \times v_c)+(d_b \times v_b))/(v_c \times v_b)$ $d_c$=density of solvated conglomerating phase
$d_b$=density of basic particles
$v_c$=volume occupied by solvated conglomerating phase
$v_b$=volume occupied by basic particles.

Differences in the degree of solvation occuring in different solvents have to be corrected for. Thus, for certain conglomerating agents, e.g. heavily charged polymers for ionexchange chromatography, the degree of salvation, i.e. the volume of liquid taken up per gram dry weight, may differ with several hundred percent in fluids with different ionic strength or pH.

By way of example the density of conglomerate particles comprising agarose as the conglomerating agent and hollow glass spheres as basic particles is regulated by the addition of hollow glass spheres to the liquified agarose, the amount added (for example measured as gram hollow glass spheres per ml agarose) being determinant for the density of the final conglomerate.

Assuming a density of the agarose phase to be 1.0 g/ml and the volume used to be one liter (1000 ml) and the density of the hollow glass spheres to be 0.2 g/ml and the amount used to be 100 g (corresponding to 500 ml) the calculated density would be:

$((1.0 \times 1000)+(0.2 \times 500))/(1000+500)=0.73$ g/ml

If only 50 g of hollow glass beads were added the calculated would be:

$((1.0 \times 1000)+(0.2 \times 250))/(1000+250)=0.84$ g/ml

If instead of the hollow glass spheres, the basic particles used were solid glass spheres with a density of 2.5 g/ml and 500 g were used to the same amount of agarose, the calculated density would be:

$((1.0 \times 1000)+(2.5 \times 200))/(1000+200)=1.25$ g/ml

"Concentration of Basic Particles"

Generally, the basic particle concentration shall be as small as possible in order to obtain as high a concentration of the active substance as possible. However, depending on the application, the basic particles concentration by volume is selected from a group consisting of:

1–95%
1.5–75%,
5–50%,
5–40%,
5–30%, most preferred.

"Dimensions of Conglomerates"

According to the invention, optimum dimensions of a conglomerate of the types according to the present invention will largely depend upon the use to which they are to be put, although limitations dictated by the nature of the material and/or by the nature of the active substance and conglomerating agent within the conglomerate may also play a role.

From the point of view of achieving the greatest rate of interaction of chemical species with a given mass of conglomerate of a particular type, it will generally be advantageous that the total surface area of the conglomerate is as large as possible, and thus that the size of the conglomerate is as small as possible.

In preferred aspects of a conglomerate according to the invention, the size of substantially all of said conglomerates is within a range selected from the group consisting of:

1–10000 µm,
1–5000 µm,
1–4000 µm,
1–3000 µm,
1–2000 µm,
1–1000 µm,
50–500 µm.

The actual size preferred is dependent on the actual application and the desired control of the dispersion properties, e.g. sedimentation and floatation, of the conglomerate both properties being dependent on the density and the size of the conglomerate. Thus, for very fast separation flow rates conglomerates of relatively low or high densities and relatively large sizes are preferred. However, large conglomerates may be limited in diffusion in certain applications, e.g. when proteins have to diffuse in and out of conglomerates and interact with active substances within the conglomerate.

Further, for conglomerates having the same density and size the, the diffusion properties of molecules within the conglomerate may depend on the number of basic particles.

Thus, for conglomerates having one basic particle, the diffusion length may be shorter than for conglomerates having many smaller basic particles. In general, conglomerates of only one basic particle may be preferred when the molecular diffusion within the conglomerate is a limiting factor of the application.

Thus, for purification and binding of proteins and other high molecular weight substances which may diffuse slowly in the conglomerate, e.g. in the conglomerating agent, the preferred size of conglomerates is within a range selected from the group consisting of:

1–2000 µm,

10–1000 µm,

50–750 µm,

100–500 µm, most prefered.

Further, particularly for purification and binding of proteins and other high molecular weight substances in a batch process, the preferred size of conglomerate particles is within a range selected from the groups of:

1–2000 µm

250–2000 µm

500–2000 µm

500–1000 µm, most preferred.

Further, for enzyme reactions in which an enzyme immobilized within the interior of the conglomerate reacts with a substrate of relatively low molecular weight, the prefered size of conglomerates is within ranges selected from a group consisting of:

10–10000 µm,

50–5000 µm,

100–3000 µm,

200–1000 µm, most preferred.

Especially for immobilisation of microorganims, the preferred size of the conglomerate is within ranges selected from the group consisting of:

0.5–50 mm 0.5–10 mm 0.5–5 mm, most preferred.

For a conglomerate within the context of the present invention to be of use, for example, in chromatographic separation processes, the time-scale of the process of diffusion of fluid i.e. gaseous or liquid phases through the conglomerate, where relevant, should preferably be short in order to ensure sufficiently rapid equilibration between extra- and intraparticular phases; this time-scale will often be of the order of seconds.

(b) Basic Particles and Materials

In selecting basic particles for use as low or high density particles according to the invention, the material of the particles depends on the purpose. Generally, the material is to be sought among certain types of natural or synthetic organic polymers, primarily synthetic organic polymers, inorganic substances and compounds, metallic elements, and alloys thereof, non-metallic elements, and gas bubbles.

"Synthetic Organic Polymers"

Among types of synthetic organic polymers which may possibly be of interest are resins of the phenol-formaldehyde type and ABS resins, but other classes of synthetic organic polymers, such as acrylic polymers, polyamides, polyimides, polyesters, polyethers, polymeric vinyl compounds, polyalkenes and substituted derivatives thereof, as well as copolymers comprising more than one such said polymer functionality, and substituted derivatives of such copolymers, may well furnish suitable candidates.

Particularly preferred low density basic particles are hollow plastic particles.

"Inorganic Substances and Compounds"

However, from the point of view of cheapness and ready availability, in some cases it is advantageous to employ particles of inorganic material, especially since materials with the greatest mechanical rigidity are generally to be found amongst inorganic materials. Thus, material of the basic particles employed in the conglomerate according to the invention may comprise a member selected from the group consisting of inorganic substances and compounds, metallic elements and alloys thereof, and non-metallic elements.

In a preferred aspect, the material comprises a member selected from the group consisting of:

anhydrous forms of silicon dioxide, including amorphous silica and quartz;

metal silicates, including silicates of lithium, sodium, potassium, calcium, magnesium, aluminium and iron, and metal borosilicates, such as borosilicates of said metals, metal phosphates, including hydroxyapatite, fluorapatite, phosphorite and autunite;

metal oxides and sulfides, including magnesium, aluminium, titanium, vanadium, chromium, manganese, iron, cobalt, nickel, copper and silver oxides;

non-metal oxides, including boric oxide;

metal salts, including barium sulfate; metallic elements, including magnesium, aluminium, titanium, vanadium, chromium, manganese, iron, cobalt, nickel, indium, copper, silver, gold, palladium, platinum, ruthenium, osmium, rhodium and iridium, and alloys of metallic elements, such as alloys formed between said metallic elements;

crystalline and amorphous forms of carbon, including graphite, carbon black and charcoal. "Gas Bubbles"

Further, in a preferred aspect the material of the basic particles may comprise gases such as air, nitrogen, carbon dioxide, or inert gases, e.g. He, Ne, Ar, Kr, and Xe, confined in a cavity.

"Siliceous Glassy or Ceramic Materials"

As mentioned earlier, the prior art discloses a number of examples of hollow particles of siliceous glassy or ceramic material which may be used as low density hollow particles of conglomerates according to the ivention, these previously disclosed particles being obtained relatively cheaply and straightforwardly by deliberate synthesis or as a fly-ash by-product of certain combustion processes.

Accordingly, in a further preferred aspect of the invention, the material of the basic particles employed in conglomerates of both low and high density particles according to the invention is a glass, preferably an synthetic glass comprising silicon dioxide and/or a silicate.

In yet another preferred aspect of the invention, such material is a silicon dioxide-containing material derived from fly-ash, in which case the material may be amorphous (e.g. glassy) or crystalline, or to some extent both amorphous and crystalline.

"Magnetic Materials"

For certain applications of a conglomerate, the material of the basic particles may comprise an appropriate amount of magnetic material e.g. for confining or retaining the conglomerate within a particular region of, for example, a process vessel or a chromatographic column, without the need for the incorporation of physical means of confinement or retention, such as a filter.

Thus, a further aspect of the invention provides conglomerates of basic particles of which the particles comprises a component selected from the group consisting of:

paramagnetic metallic elements, including iron, cobalt and nickel, and paramagnetic alloys, including alloys containing said paramagnetic metallic elements;

metal oxides, including iron(II) oxide, iron(III) oxide, cobalt(II) oxide and nickel(II) oxide;

metal salts, including cobalt(II) salts, e.g. cobalt(II) phosphate, chromium(III) salts, e.g. chromium(III) fluoride, and manganese(II) salts, e.g. manganese( II) carbonate.

"Basic Particle Structure"

Further, the material of the basic particles within the context of the present invention may be chemically and/or physically inhomogeneous. For example, it may have a layered structure involving one or more layers of similar or different materials, e.g. various types of siliceous materials. Alternatively, for example, it may consist of a siliceous material, such as a siliceous glassy material, containing particles or regions with a high content of a metal oxide or a metallic element chemically reactive, e.g. as a catalyst.

(c) Active substances

Concerning the active substances to be introduced into the conglomerate according to the invention, this may, for example, be any type of material which is useful for a given application. Further, in one aspect of the invention the active substance may itself act as a conglomerating agent keeping the basic particles together and providing mechanical stability.

In another aspect of the Invention the material of an active substance comprises a member selected-from the group consisting of organic and inorganic compounds or ions, metallic elements and alloys thereof, non-metallic elements, organic polymers of biological and synthetic origin, membrane-enclosed structures, biological cells, and virus particles.

In a preferred aspect, the active substance comprises a member selected from the group consisting of:

ligands known per se in the field of chromatography, e.g. charged species i.a. for ion exhange chromatography; proteins, dyes, enzyme inhibitors, specific ligands for specific proteins, e.g. biotin for purification of avidin and other biotin binding proteins, carbohydrates for purification of lectins or glycosidases, protein A, chelates, e.g. iminodiacetic acid; amino acids, e.g. arginine, lysine, and histidine; sulfated polymers including e.g. heparins; gelatins; benzhydroxamic acid; hydrophobic ligands, e.g. phenyl, hydrocarbons such as octyl amine, octanol; thiophilic ligands, i.e. divinyl sulfone activated substances coupled with mercaptoethanol or 4-hydroxy-pyridine, 3-hydroxy-pyridine, 2-hydroxy-pyridine; lipid vesicles;

microorganisms and enzyme systems;

virus particles, including attenuated and inactivated virus particles;

natural and synthetic polynucleotides and nucleic acids, including DNA, RNA, poly-A, poly-G, poly-U, poly-C and poly-T;

natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, and gelatins;

natural and synthetic peptides and polypeptides and other amino acid based polymers, including albumins, hemoglobulins, immunoglobulins including poly- and monoclonal antibodies, antigens, protein A, protein G, lectins, glycoproteins such as ovomucoids, biotin binding proteins e.g. avidin and streptavidin, and enzymes e.g. proteases, and protease inhibitors;

synthetic organic polymers, including acrylic polymers, polyamides, polyimides, polyesters, polyethers, polymeric vinyl compounds, polyalkenes, and substituted derivatives thereof, as well as copolymers comprising more than one such organic polymer functionality, and substituted derivatives of such copolymers;

food, medicals, and vaccines for fish and other animals living in water;

hydrated and anhydrous forms of silicon dioxide, including silica gel, amorphous silica and quartz;

metal silicates, including silicates of lithium, sodium, potassium, calcium, magnesium, aluminium and iron, and metal borosilicates, including borosilicates of said metals;

metal phosphates, including hydroxyapatite, fluorapatite, phosphorite and autunite;

metal oxides, including magnesium, aluminium, titanium, vanadium, chromium, manganese, iron, cobalt, nickel, copper, and silver oxides, and paramagnetic metal oxides, including iron(II), iron(III), Cobalt(II) and nickel(II) oxides;

metal salts, including barium sulfate, and paramagnetic metal salts, including combalt(II), chromium(III) and manganese(II) salts;

metallic elements, including magnesium, aluminium, titanium, vanadium, chromium, manganese, indium, copper, silver, gold, palladium, platinum, ruthenium, osmium, rhodium and iridium, and paramagnetic metallic elements, including iron, cobalt and nickel, and alloys of metallic and paramagnetic metallic elements, including alloys formed between said metallic and paramagnetic metallic elements.

"Introduction of Active Substance into Conglomerates"

Generally, the active substance may be introduced into the conglomerate in a number of ways depending on the nature of the active substance, conglomerating agent, and the conglomerate itself, e.g. its pore size. Thus, both low and high molecular weight ligands may be incorporated during conglomeration either by entrapment or by chemical cross-linking or by co-polymerisation.

Further, both low and high molecular weight ligands may be chemically coupled to a conglomerating agent before or after conglomeration, or they may be coupled to precursor monomers or polymers introduced together with the conglomerating agent during the conglomeration provided the desired functions of the active substance is kept intact or may be reestablished before use. However, if the means of conglomerating damages or destroys the functioning of the active substance, the fragile active substance may be introduced after conglomeration provided the conglomerate has been designed with suitable pore sizes to allow access to its interior.

"Introduction via Liquid Media"

Materials within several of the above categories, for example lipid vesicles, virus particles, certain polypeptides, and certain metal silicates and other metal salts, may be introduced into the conglomerate in the form of solutions, suspensions or dispersions in suitable liquid media.

"In Situ Formation/Sequential Introduction"

Materials within some of the other categories, for example numerous polymers and copolymers, certain metal phosphates, certain metal oxides, e.g. silver oxide, and certain metallic elements, e.g. silver, may be introduced into the conglomerate by forming them. In situ via a series of steps involving the sequential introduction into the conglomerate of a series of reagent solutions; for example silver oxide might be deposited in situ within conglomerate by partially infusing them with an aqueous solution of a soluble silver(I) salt, e.g. silver(I) nitrate, and then partially infusing them with an aqueous solution of a base, e.g. sodium hydroxide. The liquid solvent(s) may then, if desired, be removed from the conglomerate by, e.g., subjecting the conglomerate to a vacuum treatment.

"In Situ Formation/Thermal Treatment"

In some cases it may be possible to form an active substance in situ within the conglomerate by thermal treatment of a substance which has initially been introduced into or formed within the conglomerate via the introduction of one or more solutions, suspensions or dispersions in liquid media, although this obviously will require that the material of the conglomerate itself and the conglomerating agent suffer no detrimental effects as a result of the thermal treatment; for example, it is well known that the noble metals platinum and rhodium can be formed in finely divided, highly catalytically active form by heating almost any complex or binary compounds of the elements, e.g. $(NH_4)_2[PtCl_6]$ or $(NH_4)_3[RhCl_6]$, at temperatures above about 200° C. in the presence of oxygen or air.

"Incorporation of Organic Polymers or Copolymers; In Situ Polymerisation"

For the use of conglomerates according to the invention in various chromatographic procedures, e.g. ion exchange chromatography, and in other procedures, for example solid-phase peptide synthesis, the conglomerates in question may incorporate organic polymers or copolymers. By way of example, the application of a permeable conglomerate according to the invention to peptide synthesis employing the classical chemical methodology of Merrifield [see, e.g., Barany et al, *Int. J. Peptide Protein Res.* 30 (1987) pp. 705–739] will initially require the in situ formation of a cross-linked styrene/divinylbenzene copolymer resin by polymerization of styrene monomer containing, typically, about 1–2% of divinylbenzene; the resin may then be functionalized by subsequent treatment of the resin-containing conglomerate with solutions of the appropriate reagents.

Thus, in a further aspect of a conglomerate according to the invention, the active substance comprises a polymer or a copolymer formed in situ within the conglomerate by a procedure comprising the steps of:

immersing the conglomerate in a solution, in a liquid solvent or solvent mixture, of one or more components which can polymerize or copolymerize to form a polymer or a copolymer or mixtures thereof, the solution optionally containing a polymerization catalyst or initiator, allowing the solution to at least partly fill the conglomerate via the through-going pores, allowing the polymer-/copolymer-forming components to polymerize/copolymerize to form solid polymer(s)/copolymer(s) therein, optionally substantially removing any liquid solution remaining within the conglomerate, optionally further treating the polymer-/copolymer-containing conglomerates as to:

(i) at least partly chemically derivatize and/or modify the polymer(s)/copolymer(s) within the conglomerate and/or (ii) introduce further components into the conglomerate.

"Incorporation of Fragile Active Substances"

Materials other than those mentioned above may also conceivably be incorporated as components of porous conglomerates; for example, for certain biotechnological applications, such as the preparation of vaccines, antibodies or toxins, or cell cultivation for the production of metabolites (e.g. the production of ethanol by yeast cells) it may be desirable, according to the invention, to introduce live or dead cells of human, animal, plant, fungal or microoganism origin, or organelles (such as nuclei, mitochondria, chloroplasts or lysozomes) of similar origin, into conglomerates in situ. This will, of course, necessitate the provision of relatively large permeable conglomerates having through-going pores of a suitably large size, e.g. of the order of ca. 5–20 $\mu$m in the case of several types of human cells such as it will then often be necessary or desirable, after the introduction of such cells or organelles, to coat the resulting conglomerates by a suitable treatment, so as to retain the cells or organelles within the conglomerates but allow migration of smaller species into or out of the conglomerates. This may be done by coating the conglomerates with a suitable membrane material having a suitable permeability.

"Pore Sizes and Their Formation"

The optimum size or size-range of the through-going pores will, of course, vary very considerably, depending on the use to which the permeable conglomerate is to be put. Such pore sizes are difficult to characterize quantitatively; however, in terms of the size of the molecules which are to be capable of passing through the pores, a realistic upper exclusion limit for macromolecules, notably biological macromolecules, such as proteins, will often be a molecular weight of the order of magnitude of $10^8$. The practical lower-limit for pore-size will generally be set by physicochemical considerations, e.g. the detailed chemical structure of the outer part and the manner in which the outer part material dissolves or reacts during the pore-formation process. Although possibly rather difficult to achieve, the formation of through-going pores with sizes of the order of a few Angstrom would be advantageous, in that the resulting permeable conglomerate in question would be expected to be applicable as so-called "molecular sieves"; for example, a typical application of permeable conglomerates with pores of this size would be as materials for removing traces of water from organic solvents, and the relatively large internal cavity volume of such conglomerates should confer a large drying capacity per per volume unit of conglomerate.

Pore sizes may typically be formed by methods known per se, e.g. by simply controlling the concentration of the conglomerating agent. Thus, for agarose or acrylamide-derivatives a larger concentration will provide a smaller pore size. However, other methods may be applied depending on the conglomerating agent and e.g. the incorporated polymers and copolymers.

"Activation or Derivatization"

In cases where the conglomerating agent may not have the properties to function as an active substance, the conglomerating agent, or agents, or polymers introduced in the conglomerate, may be derivatized to function as one or more active substances by procedures of activation or derivatisation well known per se. Thus, materials comprising hydroxyl, amino, amide, carboxyl or thiol groups may be activated or derivatized using various activating chemicals, e.g. chemicals such as cyanogen bromide, divinyl sulfone, epichlorohydrine, bisepoxyranes, dibromopropanol, glutaric dialdehyde, carbodiimides, anhydrides, hydrazines, periodates, benzoquinones, triazines, tosylates, tresylates, and diazonium ions.

(d) Conglomerating Agents

In selecting the conglomerating agent for use as a means of keeping the basic particles together and as a means for binding, entrapping, or carrying the active substance, the conglomerating material is to be sought among certain types of natural or synthetic organic polymers, and inorganic substances.

"Organic Polymers"

In one aspect of the invention the material of the conglomerating agent comprises a member selected from the group consisting of organic monomers and polymers of biological and synthetic origin.

In a preferred aspect, the conglomerating agent comprises a member selected from the group consisting of:

natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, and gelatins;

synthetic organic monomers and polymers resulting in polymers, including acrylic polymers, polyamides, polyimides, polyesters, polyethers, polymeric vinyl compounds, polyalkenes, and substituted derivatives thereof, as well as copolymers comprising more than one such organic polymer functionality, and substituted derivatives thereof.

"Inorganic Substances"

In another preferred aspect, the conglomerating agent comprises a member selected from the group consisting of:

hydrated and anhydrous forms of silicon dioxide, including silica gel, amorphous silica and quartz;

metal silicates, including silicates of lithium, sodium, potassium, calcium, magnesium, aluminium and iron, and metal borosilicates, including borosilicates of said metals;

metal phosphates, including hydroxyapatite, fluorapatite, phosphorite and autunite;

metal oxides and sulfides, including magnesium, aluminium, titanium, vanadium, chromium, manganese, iron, cobalt, nickel, copper, and silver oxides, and paramagnetic metal oxides, including iron(II), iron(III), cobalt(II) and nickel(II) oxides;

metal salts, including barium sulfate, and paramagnetic metal salts, including cobalt(II), chromium(III) and manganese(II) salts;

metallic elements, including magnesium, aluminium, titanium, vanadium, chromium, manganese, indium, copper, silver, gold, palladium, platinum, ruthenium, osmium, rhodium and iridium, and paramagnetic metallic elements, including iron, cobalt and nickel, and alloys of metallic and paramagnetic metallic elements, including alloys formed between said metallic and paramagnetic metallic elements.

"The Active Substance as Conglomerating Agent"

In one aspect of the invention the conglomerating agent may be omitted in the sense that the active substance itself can function as a conglomerating agent. Thus, as mentioned, in a preferred aspect of the invention, the active substance may e.g. function as- a conglomerating agent. In this case the conglomerating agent may comprise a member selected from the group consisting of:

microorganisms and enzyme systems;

natural and synthetic polynucleotides and nucleic acids, including DNA, RNA, poly-A, poly-G, poly-U, poly-C and poly-T;

natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, and gelatins;

natural and synthetic peptides and polypeptides and -other amino acid based polymers, including albumins, hemoglobulins, immunoglobulins including poly- and mono clonal antibodies, antigenes, protein A, protein G, lectins, glycoproteins such as ovomucoids, biotin binding proteins e.g.—avidin and streptavidin, and enzymes e.g. proteases, and protease inhibitors;

special synthetic organic polymers, including specifically designed acrylic polymers, polyamides, polyimides, polyesters, polyethers, polymeric vinyl compounds, polyalkenes, and substituted derivatives thereof, as well as copolymers comprising more than one such organic polymer functionality, and substituted derivatives thereof;

special hydrated and anhydrous forms of silicon dioxide, including specifically design silica gel, amorphous silica and quartz;

special metal silicates, including specifically designed silicates of lithium, sodium, potassium, calcium, magnesium, aluminium and iron, and metal borosilicates, including borosilicates of said metals;

special metal phosphates, including specifically designed hydroxyapatite, fluorapatite, phosphorite and autunite;

special metal oxides sulfides, including specifically designed magnesium, aluminium, titanium, vanadium, chromium, manganese, iron, cobalt, nickel, copper, and silver oxides, and paramagnetic metal oxides, including iron(II), iron(III), cobalt(II) and nickel(II) oxides;

special metal salts, including specifically designed barium sulfate, and paramagnetic metal salts, including combalt(II), chromium(III) and manganese(II) salts;

special metallic elements, including specifically designed magnesium, aluminium, titanium, vanadium, chromium, manganese, indium, copper, silver, gold, palladium, platinum, ruthenium, osmium, rhodium and iridium, and paramagnetic metallic elements, including iron, cobalt and nickel, and alloys of metallic and paramagnetic metallic elements, including alloys formed between said metallic and paramagnetic metallic elements; and other materials used as active substance provided they can conglomerate the basic particles.

"Activation or Derivatization of Conglomerating Agents"

However, in cases where the conglomerating agent may not have the properties to function as an active substance, the conglomerating agent may be derivatized to function as one or more active substances by procedures of activation or derivatisation well known per se. Thus, materials comprising hydroxyl, amino, amide, carboxyl or thiol groups may be activated or derivatized using various activating chemicals, e.g. chemicals such as cyanogen bromide, divinyl sulfone, epichlorohydrine, bisepoxyranes, dibromopropanol, glutaric dialdehyde, carbodiimides, anhydrides, hydrazines, periodates, benzoquinones, triazines, tosylates, tresylates, and diazonium ions.

(e) Illustration of Conglomerate Particles

FIG. 1A shows a 40× amplified photograph of aspherical conglomerate particles 10 having 1–2 mm of diameter and being prepared by distibuting unicellar glass microspheres 11 in conglomerating agarose 12 according to Example 1(a).

Figure 1B:
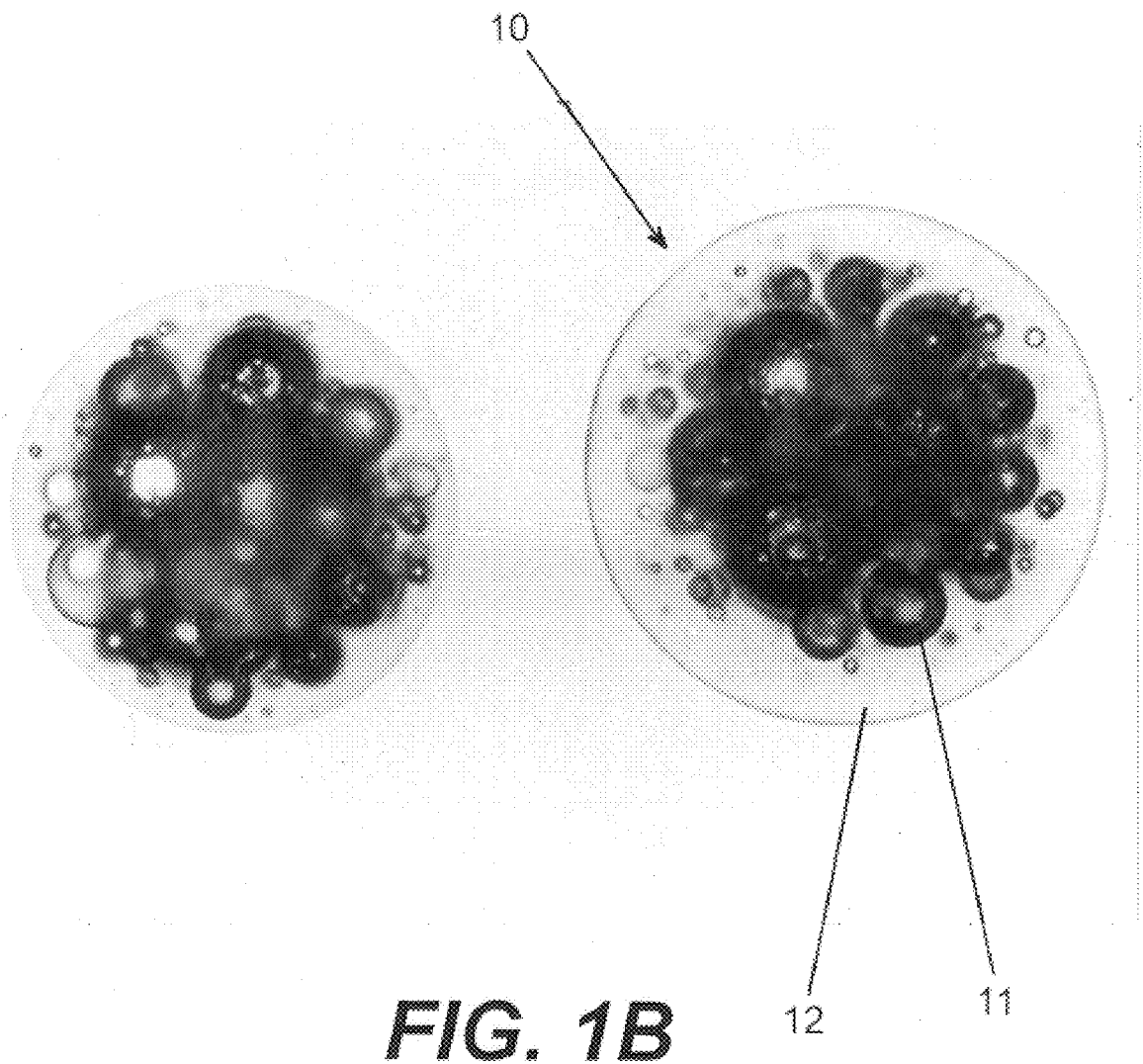
FIG. 1B shows a 40× amplified photograph of selected spherical conglomerates of agarose and glass spheres prepared according to Example 1(a)

FIG. 1B shows a 40× amplified photographs of selected spherical conglomerate particles also prepared according to Example 1(a).

Figure 1C:
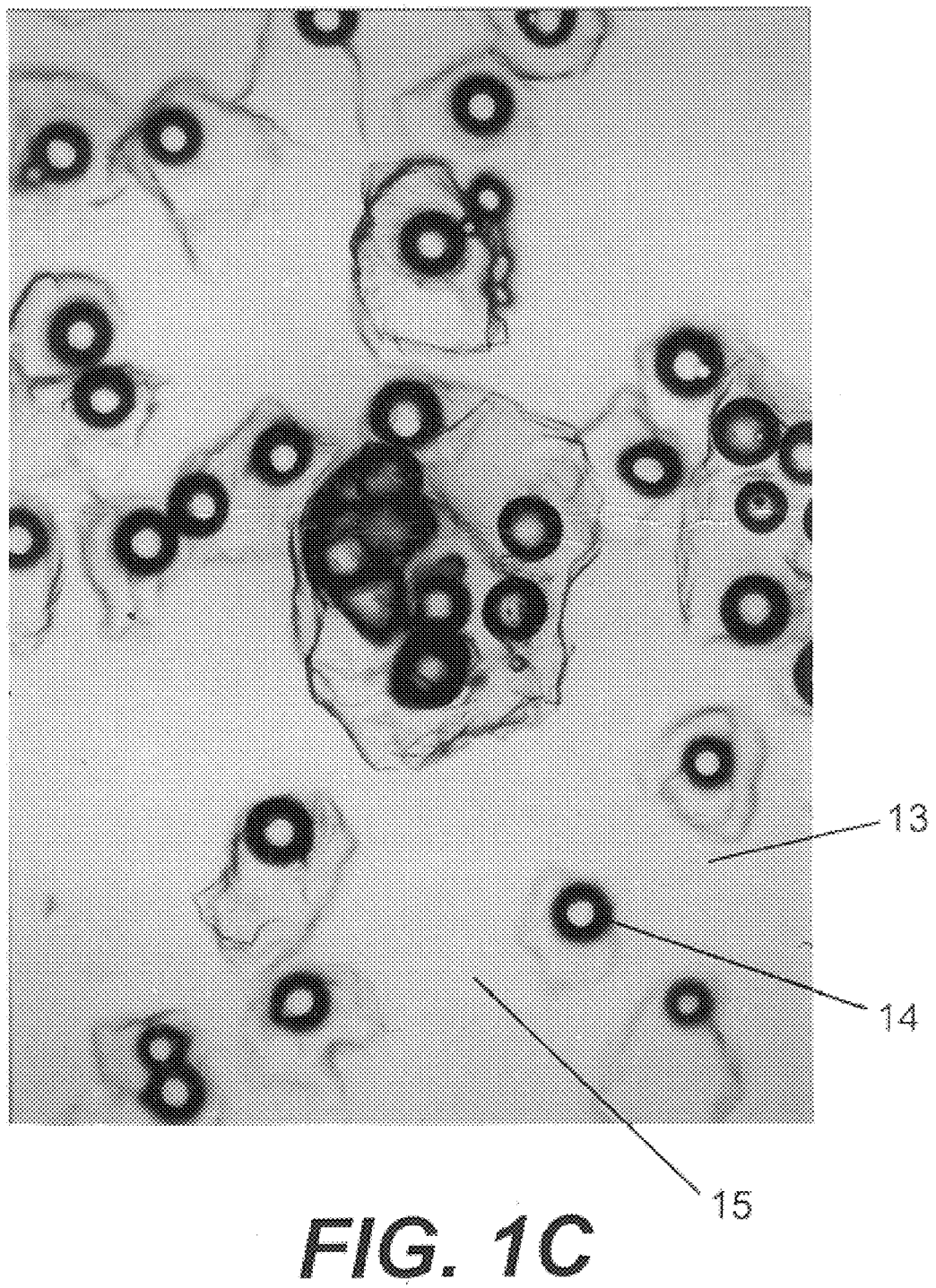
FIG. 1C shows a 40× amplified photograph of conglomerates of acrylic acid copolymer and single solid glass spheres prepared according to Example 11.

FIG. 1C shows a 40× amplified photograph of aspherical conglomerated particles 13 comprising a single solid glass sphere 14 and an acrylic acid copolymer 15 prepared according to Example 11.

(f) Fluid Bed Reactors

"C Reactor"

Figure 2:
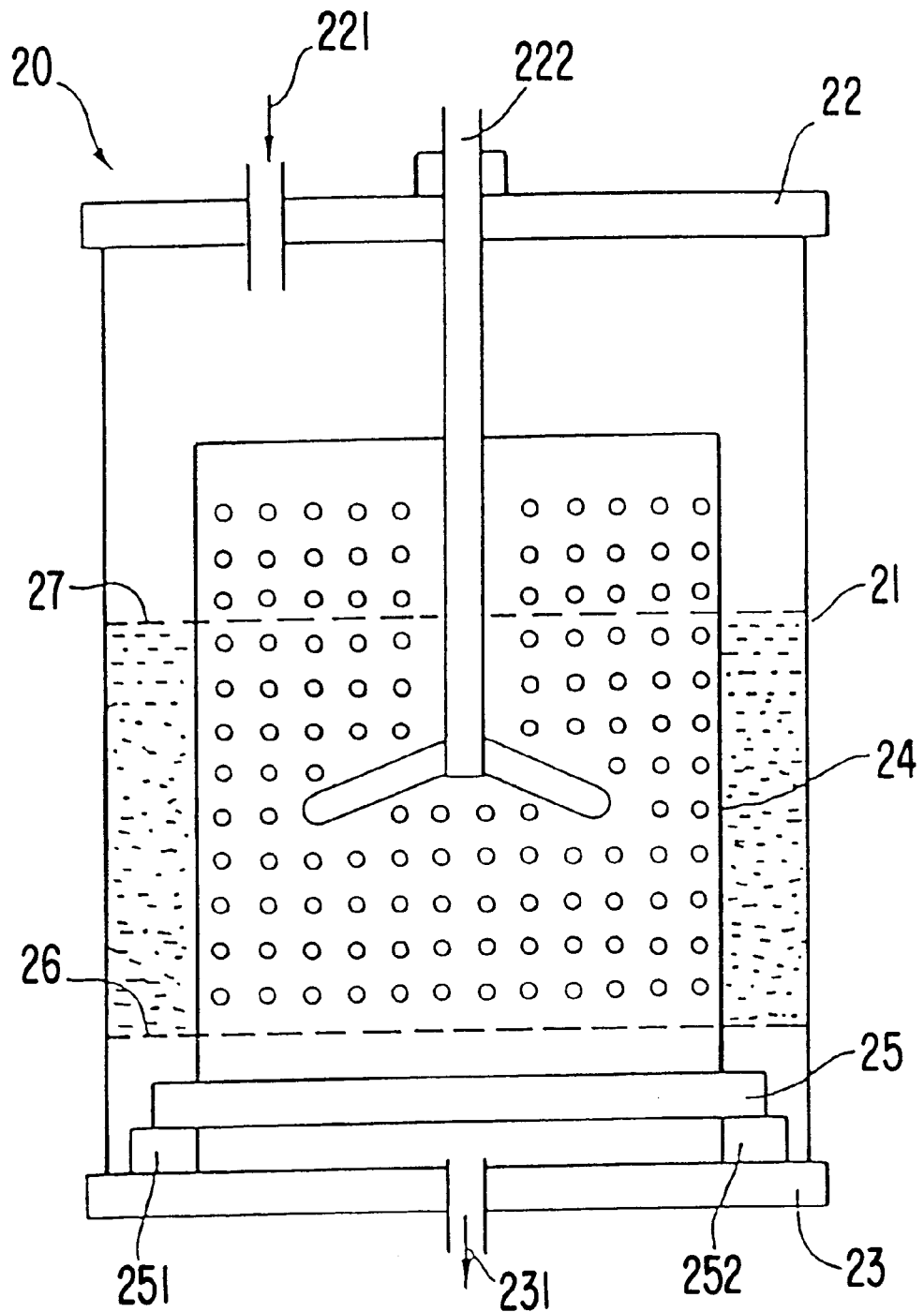
FIG. 2 illustrates a preferred embodiment of a fluid bed reactor.

FIG. 2 illustrates a cross section of a preferred embodiment of a fluid bed reactor 20 composed of a outer cylinder 21, a top lid 22 with inlet 221 and connection for a stirrer 222, and a bottom lid 23 with outlet 231. Further, an inner cylinder 24 having holes and mounted on a support 25 attached to support blocks 251 and 252 allowing passage of the fluid. Stirring is performed at a suitable rate of rotation within the inner cylinder 24 to assure a sharp lower boundary 26 of the fluid bed conglomerates. Without stirring, the bed of light conglomerates float against the top lid 22 and have a lower boundary 27.

"T Reactor"

Figure 3:
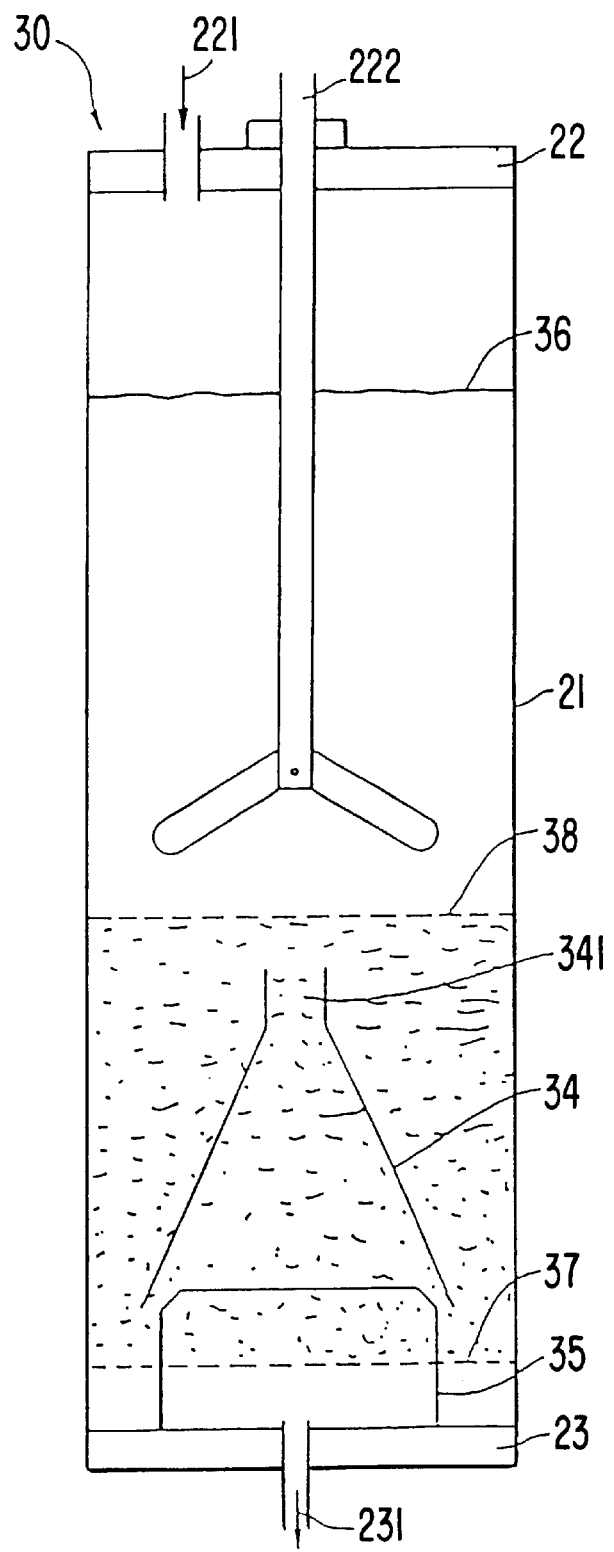
FIG. 3 illustrates another preferred embodiment of a fluid bed reactor.

FIG. 3 illustrates a cross section of another preferred embodiment of a fluid bed reactor 30 similar to the reactor illustrated in FIG. 2 except that the inner cylinder 24 is replaced by an inverse funnel 34 having an upper outlet 341 and supported by a support cylinder 35 that is open upwards. Conglomerates arriving below the funnel in the turbulens free volume will rise up through the upper outlet 341 while fluid flow down through the outlet 231.

The stirrer is placed right below the surface 36 and stirring is performed at a suitable rate of rotation to provide a sharp lower boundary 37 of the conglomerates. Without stirring, the bed of light conglomerates have a lower boundary 38.

"Controlled Fluid-Distribution in Fluid Bed Reactors"

Figure 4A:
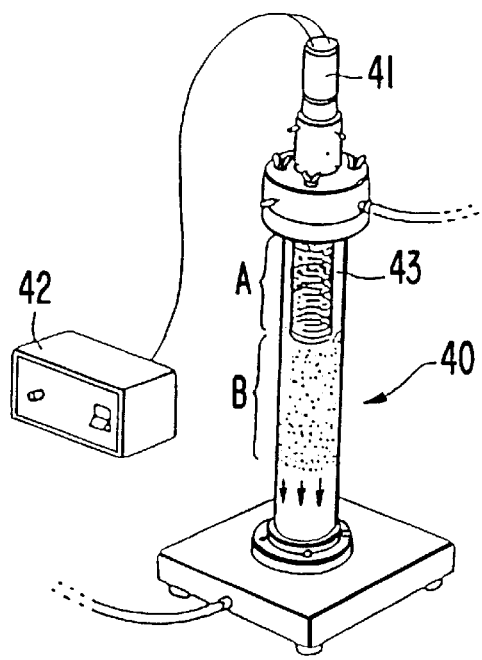
FIG. 4A and 4B show perspective sketches of another preferred embodiment of a down flow fluid bed reactor.

FIG. 4A- and 4B show perspective sketches of a preferred embodiment of a down flow fluid bed reactor 40.

A dc-motor 41 controlled by a variable speed control 42 provides revolutions of a stirrer 43, which in a mixing zone A agitates the fluid bed particles to generate a turbulent flow of the fluid flowing down-ward.

A sharp interface (generally of few particle diameters) is reached at the non-mixing zone B in which the particles are stationary and an even and smooth distribution of the fluid is obtained.

In order to adapt the conditions of agitation the length of the fluid bed column can be changed by means of interchangeable chromatographic tubes 45.

(A) "Down-Flow Fluid Bed Reactor"

Figure 5:
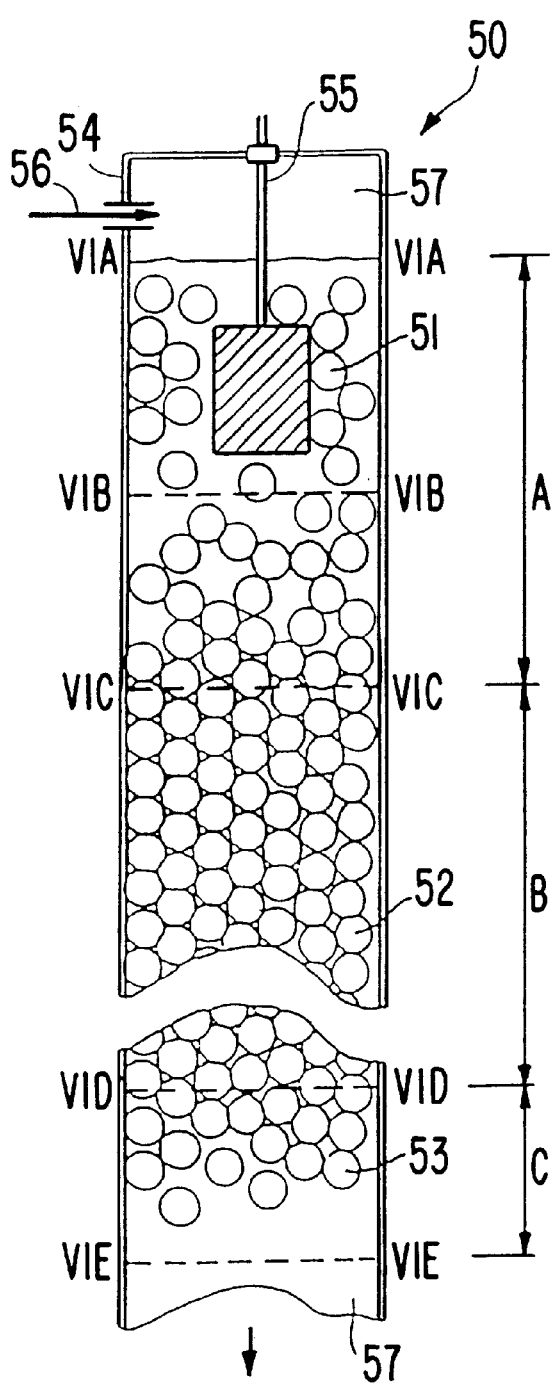
FIG. 5 illustrate the fluid bed particles of conglomerates according to the invention in a down flow fluid bed reactor.

FIG. 5 shows a longitudinal section of a segment of a down-flow fluid bed reactor 50 comprising a vertical cylinder 54 and a fluid bed A,B,C of particles 51,52,53 suspended in a down-flow fluidizing fluid 56 let in through an inlet at the top of the reactor vessel, the particles 51,52,53 having a specific gravity less than that of the fluid. A gas head 57 is above the surface along the line VIA—VIA.

The upper part of the fluid bed is agitated by a plate formed mechanical stirrer 55 dividing the bed into a mixing zone A, a non-mixing zone B, and an exit zone C.

In the mixing zone A, the agitated fluid bed particles 51 move dynamically which generates a turbulent flow of the fluid. The turbulence decreases down the mixing zone A. A sharp interface VIC—VIC is reached at the non-mixing zone B in which the particles 52 are in a stationary fluidized state. Across the interface VIC—VIC, the fluid flow is distributed evenly, and a smooth fluid flow is obtained in the non-mixing zone B.

In the exit zone C, the pooled reacted and/or unreacted fluid 57 leave the fluid bed at an interface VID—VID, where particles 53 can become separated from the fluid bed by the fluid flow.

Figure 6A:
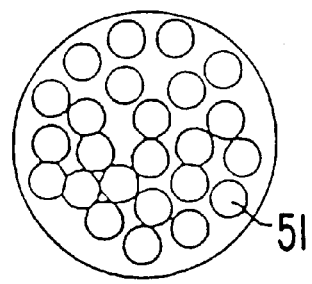
FIG. 6A–6D illustrate cross-sections along the lines VIB, VIC, VID, VIE in FIG. 5.
Figure 6B:
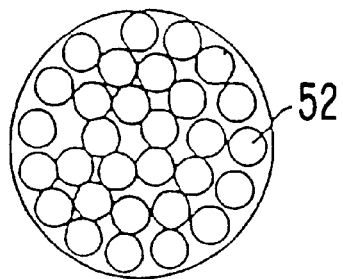
Figure 6C:
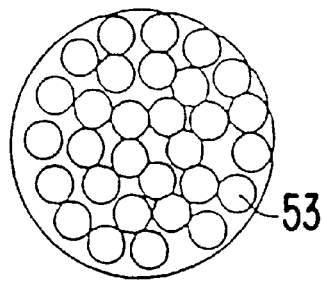

FIGS. 6A–6C show cross sections of the mixing zone A along the lines VIB—VIB, VIC—VIC, and VID—VID, respectively, of the FIG. 5. Thus, FIG. 6A shows a cross section of essentially randomly moving particles 51, and FIG. 6B & 6C show cross sections of essentially stationary fluidized particles 52 and 53.

Figure 6D:
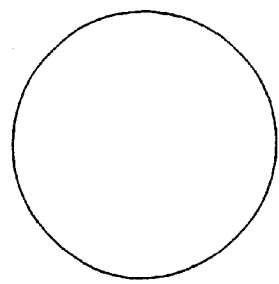

FIG. 6D shows a cross section, along the line VIE—VIE, essentially without particles.

(g) Batch Reactors

In solid phase reactions, e.g. in adsorption of at least one selected substance from a fluid medium or in an enzyme reaction procedure, the reaction may be performed in a batch reactor. Generally the procedure will be to bring the conglomerate particles in contact with the liquid to be treated in a stirred tank for a certain time (the length of which is determined by the rate of adsorption of the conglomerate particles or the rate of enzymatic reaction, respectively) followed by separation of the conglomerate particles from the liquid.

Figure 7:
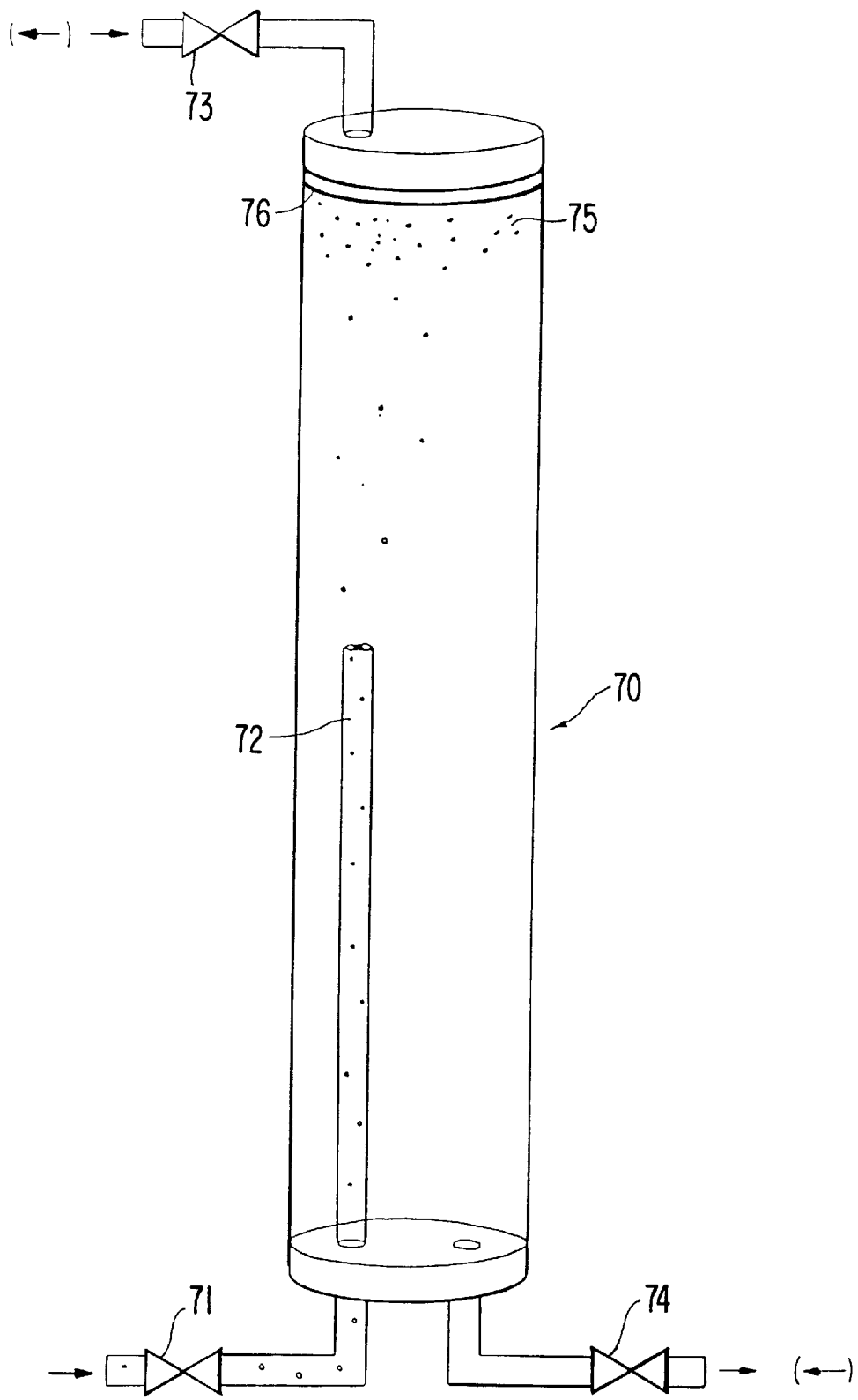
FIG. 7 illustrates the collection of fluid bed particles of conglomerates according to the invention in a collecting vessel of a protein purification batch process.

FIG. 7 shows a collection vessel applied in a protein purification batch process. Conglomerate particles previously contacted with the adsorbent or reagent in the liquid to be treated are pumped through the inlet valve 71 of the collection vessel 70. The low density conglomerate particles raise continuously to the top 75 of the vessel as they enter through a pipe 72 and are then trapped in the vessel (the valve 73 being closed), while the extract is leaving the vessel through the outlet valve 74.

After collection of the conglomerate particles in the top section 75 of the vessel, the vessel and the particles are washed by pumping a suitable washing liquid e.g a solution of sodium chloride through the now opened valve 73 in the top and out through the outlet valve 74 in the bottom of the vessel (the valve 71 being closed).

Particularly for purification and adsorption purposes, the bound adsorbent is then eluted from the conglomerate particles (still being in the top of the vessel) by pumping a suitable eluent e.g. hydrochloric acid into the vessel through valve 74 (arrow in parenthesis) in the bottom, up through the bed of conglomerate particles and out through valve 73 in the top of the vessel 75 (the valve 71 being closed and the particles being retained within the vessel by the coarse filter 76).

EXAMPLES

All solutions employed in the following examples are aqueous solutions unless otherwise indicated.

Example 1

Preparation of conglomerates based on 3M's unicellar-glass microspheres "Glass Bubbles", B28/750, C15/250, and E22/-400, [soda-lime-borosilicate] having a mean density of 0.28 g/cm$^3$, 0.15 g/cm$^3$, and 0.22 g/cm$^3$, respectively.

(a) Low-Density Agarose Hollow Glass Spheres Conglomerated Particles 300 ml soya bean oil was heated together with 3 ml sorbitane sesquiolate to 60° C. 5 ml 6% agarose (HSA, Litex) in water was heated and 0.5 g hollow glass spheres (3 M, B28/750) having a mean density of 0.28 g/cm were added under stirring. Following mixing of 100 the agarose and glass microspheres the suspension was added to the soya bean oil under heavily stirring. The emulsion formed was stirred at about 60° C. In five minutes and cooled to 20° C. The solidified agarose particles containing basic particles of 5 hollow glass spheres were washed on a sintred glass filter with sufficient ether until all soya bean oil was removed. The conglomerate was then washed with water. The conglomerate had a low density and was floating on water.

(b) Low Density Agarose Hollow Glass Sphere Conglomerated Block Polymer Particles 300 ml 4% agarose was prepared by heating 12 g agarose (HSA, Litex) in 300 ml water. 9 g hollow glass spheres 5(C15/250, 3M) was added and the mixture was stirred until a homogeneous suspension was obtained. The suspension was cooled to 60° C. under steadily stirring and the fluid suspension poured on to an efficiently cooled surface. The agarose glass sphere suspension was gelated over a short period. The gel block had a homogeneous distributed content of hollow glass spheres. After cooling the gel block was blended and the granulate was sorted according to size and flow ability by means of "reverse sedimentation".

(c) Low Density Polyamide Hollow Glass Sphere Congomerated Particles 5 g acrylamide and 0.5 g N,N'-methylenbis(acrylamide) were dissolved in 100 ml 0.1 M potassiumhydrogenphosphate-HCl, pH 7.0. 3 g hollow glass spheres (C15/250, 3M) were added under stirring. Following the formation of a homogeneous suspension a catalyst of 1 g ammoniumpersulphate and 0.5 ml N,N,N',N'-tetramethylethylendiamine was added for the polymerisation. Stirring was continued until a highly viscous suspension was formed. Following polymerisation the polymer block containing hollow glass spheres was blended as described under (b).

(d) Low Density Gelatin Hollow Glass Sphere Conglomerated Particles

Five samples of 100 ml 5% gelatin (35° C.) in 0.15 M sodium chloride were added hollow glass spheres (E22/400, 3M) in increasing amounts:

A: 0 g
B: 2 g
C: 5 g
D: 20 g
E: 27 g

After adjustmen of pH to 5.5 all samples were added 2.0 ml glutaric dialdehyde (25% solution, cat. no.: 82063, Merck) under thorough stirring. After 24 hours of incubation at room temperature the polmerized matrices were disintegrated in a blender. The resulting particles were separated from fines by reverse sedimentation (for A by sedimention as these particles were not floating). The particles were then collected on a glass filter and drained for excess water by vacuum suction on the glass filter. The wet but drained particles were then weighed and the particle volume determined by adding a known amount of liquid followed by determination of the total volume. The following particle densities were obtained:

|    | Measured Density: | Calculated, Density: |
|----|-------------------|----------------------|
| A: | 1.0 g/ml          | 1.00 g/ml            |
| B: | 0.9 g/ml          | 0.93 g/ml            |
| C: | 6.8 g/ml          | 0.85 g/ml            |
| D: | 0.6 g/ml          | 0.63 g/ml            |
| E: | 0.5 g/ml          | 0.57 g/ml            |

(e) Low Density Gelatin Hollow Glass Sphere Conglomerated Particles, and Immobilization of Horse-Radish Peroxidase 1 g of horse-radish peroxidase (grade II, Kem-En-Tec, Denmark) was dissolved in a solution of 100 ml 10% gelatin (cat. no.: G-2500, Sigma) and 0.5 M sodium chloride (35°). 10 g hollow glass spheres (B28/750, 3M) were added under stirring. After adjustment of pH to 5.5, 2 ml glutaric dialdehyde (25% solution, cat. no.: 820603, Merck) was added with thorough stirring. The resulting gel was incubated at room temperature for 2 hours and then disintegrated in a blender. The floating particles were separated from fines and non-floating particles by inverse sedimentation. The yield of wet, packed particles was approx. 120, ml. The size range was determined to be from about 200 to about 500 μm in diameter.

(f) Low Density Gelatin Glass Sphere Conglomerated Particles, and Immobilization of Yeast Cells 50 g bakers yeast cells were suspended in a solution of 100 ml 10% gelatin and 0.15 M sodium chloride at 35° C. The suspension was added 20 g hollow glass spheres (B28/750, 3M). After adjustment of pH to 5.5, 2 ml glutaric dialdehyde (25% solution, cat. no.: 820603, Merck) was added with stirring. After two hours of incubation at room temperature the resulting block polymer was disintegrated in a blender and the particles were washed with 5 liters of 0.15 M sodium chloride. Non-floating particles were separated from floating particles by inverse sedimentation. Approximately 200 ml of packed floating particles containing yeast cells were obtained. The size of these particles spanned from about 150 to about 750 μm.

The ability of the floating immobilized yeast cells to ferment glucose was evident from the evolvement of carbon-dioxide, when incubated in a 10% glucose solution.

(g) Low Density Gelatin Glass Sphere Conglomerated Particles, and Immobilization of Yeast Cells 50 g bakers yeast cells were suspended in 100 ml 10% gelatin (cat. no.: G-2500, Sigma), 0.15 M sodium chloride at 35° C. The suspension was added 20 g hollow glass spheres (B28/750, 3M) After thorough mixing the suspension was cooled by pouring onto an ice cold glassplate making the suspension into a firm gel. The resulting gel was disintegrated in a blender and the particles washed with 5 liters of 0.15 M sodium chloride. Non-floating particles were separated from floating particles by inverse sedimentation. Approximately 200 ml of packed floating particles containing yeast cells were obtained. The size of these particles spanned from about 150 to about 750 micrometers. The ability of the floating immobilized yeast cells to ferment glucose was evident from the evolvement of carbon-dioxide, when incubated in a 10% glucose solution.

(h) Low Density Agar-Gelatin Glass Sphere Conglomerated Particles I 2 g agar (Bacto-agar, Difco), and 3 g gelatin (cat. no.: G-2500, Sigma) was dissolved in 100 ml 0.15 M sodium chloride by brief heating to the boiling point. After cooling to about 56° C. 10 g hollow glass beads (B28/750, 3M) were added. pH was adjusted to 4.0 with 5 M acetic acid followed by the addition of 2 ml glutaric dialdehyde (25% solution, Cat. No. 820603, Merck) with thorough stirring. The resulting polymer block was cooled to room temperature and incubated for 24 hours followed by disintegration in a blender.

Floating particles were separated from fines and non-floating particles by inverse sedimentation followed by collection of the floating particles on a glass filter. The yield of floating conglomerate particles was 95 ml packed wet particles.

(i) Low Density Agar-Gelatin Glass Sphere Conglomerated Particles II 2 g agar (Bacto-agar, Gibco) and 3 g gelatin (cat. no.: G-2500, Sigma) was dissolved in 100 ml 0.15 M sodium chloride by brief heating to the boiling point. After cooling to about 56° C. 10 g hollow glass beads (B28/750, 3M) were added. The suspension was then cooled by pouring it onto an ice-cold glassplate. The resulting gel block was incubated for 24 hours at 4° C. followed by disintegration by blending in ice-water. The conglomerate floating gel-particles were separated from non-floating particles by inverse sedimentation and then collected on a glass filter. The yield was 105 ml of packed, wet particles.

The particles were then suspended in 200 ml 0.1 M potassium phosphate buffer pH 6.5 and crosslinked for two hours by addition of 10 ml glutaric dialdehyde (25% solution, 820603, Merck).

(j) Low Density Chitosan Glass Sphere Conglomerated Particles

A 4% solution of chitosan (Cat. No.: 22741, Fluka) was prepared by heating 12 g chitosan in 300 ml 10% v/v acetic acid. The viscous solution was cooled to about 40° C. followed by addition of 20 g hollow glass beads (B28/750, 3M). 3 ml glutaric dialdehyde was added (25% solution, 820603, Merck) with thorough stirring. The resulting polymer block was incubated for 24 hours at room temperature followed by disintegration in a blender.

The conglomerate floating gel-particles were separated from non-floating particles by inverse sedimentation in 0.1 M sodium chloride and then collected on a glass filter. The yield was 400 ml of packed, wet particles with a diameter from about 200 μm to about 800 μm.

(k) Vinyltriethoxysilan Coated Glass Spheres and Polyamide Conglomerated Particles (A) "Coating of the Glass Spheres"

75 g (dry) hollow glass spheres (C15/250, 3M) were mixed with 500 ml 1% vinyltriethoxysilan solution in 0.1 M acetic acid and the suspension was stirred for one hour. The vinyltriethoxysilan solution was removed by filtration on a glass filter.

(B) "Conglomerating Acrylamide and Glass Spheres"

1.5 g N,N'-methylenbisacrylamide was dissolved in 10 ml ethanol and mixed with 8.5 g acrylamide dissolved in 90 ml water. 15 g vinyltriethoxysilan coated glass spheres, from (A), was added under stirring. 0.5 g ammoniumpersulphate and 0.5 ml N,N,N',N'-tetramethylethylendine was added as polymerisation catalysts after a homogeneous suspension was reached. The stirring was continued until the polymer block was formed. The polymer block was subsequently blended as described in Example 1(b) and "fines" were removed by "inverse sedimentation". This procedure resulted in approx. 100 ml low density conglomerate.

Example 2

Chemical Derivatisation of Low Density Agarose Glass Sphere Conglomerated Particles 10 g (dried, wet weight) agarose conglomerate spheres containing hollow glass spheres from Example 1 were suspended in 100 ml 0.5 M Potassiumphosphate/sodiumhydroxide pH 11.4. 10 ml divinyl sulfon og 50 mg sodiumborohydrid were added under stirring. The suspension was stirred at room temperature for three hours and the spheres were washed with water on a glass filter. The spheres were then activated chemically (i.e. a method out of many possibilities) and were ready for coupling of other substances. As an example mercaptoethanol was coupled for salt-dependent chromatopgraphy: The spheres were reacted with 5% mercapto ethanol in water that had been titrated to pH 9.5 with 1 M sodiumhydroxide for 3 hours at room temperature.

The spheres were then washed thoroughly with destined water and were ready to use in purification of proteins using salt-dependent chromatopgraphy.

Example 3

Purification of Human Immunoglobulin from Untreated Blood 100 g (dried, wet weight) divinylsulfon and mercaptoethanol treated agarose conglomerate spheres equilibrated with and suspended in 50 ml 0.75 M ammoniumsulphate were placed in a cylindrical glass column with an inner diameter of 5 cm and length of 10 cm. The glass column was sealed at the top and bottom using unscrewing plastic caps. The bottom lit had an outlet with a tube piping in the middle while the top lit had a corresponding inlet and a mechanical stirrer. The mechanical stirrer provides stirring through a air tight collar for stirring the conglomerate spheres contained in the column. The stirring propeller was designed to avoid fluid flow that carries the agarose conglomerate spheres down to the outlet in the bottom column. 2 l unfiltrated and not centrifugated human blood (i.e. outdated blood from a blood bank) having been added ammoniumsulphate to a final concentration of 0.75 M is lead through the column from the top with a flow of 10 ml/min under stirring with the abovementioned stirrer (i.e. to avoid the formation of channels through the fluid bed). 2000 ml of 0,75 M ammoniumsulphate was added at the same flow rate for washing non-bound proteins and particulates. Finally, the bound proteins were eluted from the conglomerate spheres by leading 500 ml of 0.1 M sodium chloride through the column.

About 5 g human immunoglobulin was eluted in the sodium chloride fraction. Qualitative analysis showed a high purity of immunoglobulin having a very small contamination of albumin (<1%). A corresponding purification of immunoglobulins with divinylsulfon and mercaptoethanol treated agarose spheres without hollow glass spheres was not possible in a traditionally packed column because of clogging of the column by the red blood cells and other sticky materials in blood plasma.

Example 4

Immnunosorption

Agarose conglomerate spheres containing 4% agarose and produced as described in Example 1 were activated with divinylsulfon as described in Example 2.

10 g (drained, wet weight) activated gel was coupled to rabbit immunoglobulin by incubation of the gel over night with 20 ml rabbit immunoglobulin solution (10 mg immunoglobulin/ml in 0.1 M sodiumhydrogencarbonate/sodiumhydroxide buffer, pH 8.6 and 5% w/v polyethylenglycol MW 20,000). Excess active groups were blocked by incubation of the gel with 0.5 M ethanolamine/HCl pH 9.0 for three hours. The gel was coupled with more than 80% of the added rabbit immunoglobulin.

The floating conglomerate spheres having rabbit immunoglobulin attached could then be applied in an apparatus corresponding to the one in Example 3 for adsorption of antibodies against rabbit immunoglobulin from untreated serum of previously pure rabbit immunoglobulin immunized goats. The separated antibody was of a purity and activity correspnding to that obtained with conventionally packed columns using filtered and centrifuged antiserum.

Example 5

Preparation of Ion Exchange Conglomerates (a) Cation Exchange Conglomerates. Conglomeration of polyacrylic acid/acrylamide/N,N'-methylen-bis (acrylamide) and hollow glass spheres.

300 ml destined water was added to 25 ml acrylic acid, 100 ml ethanol, 10 g N,N'-methylen-bis(acrylamide), 25 g acrylamide, 2 g ammoniumpersulphate, 25 g hollow glass spheres (B28/750, 3M) and 2 ml N,N,N',N'-tetramethylethylendiamine. The mixture was stirred until a homogeneous suspension was achieved and then titrated to pH 8.5 with 5 M sodiumhydroxide under steadily stirring. Stirring was continued until polymerisation of the suspension ocurred. Following polymerisation the block was blended as described in Example 1 (b) and "fines" were separated by means of "inverse sedimentation". Following a thoroughly wash of the particles with water, 0.1 M HCl and 0.1 M NaCl, the content of carboxyl groups in the gel was determined to be about 250 μmol per g drained wet gel by simple titration.

(b) Conglomeration of Acrylic Acid/acrylamide/N,N'-methylenbisacrylamide and Vinyltriethoxysilan Coated Hollow Glass Spheres 60 g (dry) hollow glass spheres (C15/250, 3M), 40 ml acrylic acid, 32 g acrylamide, 8 g N,N'-methylenbisacrylamide and 5 ml vinyltriethoxysilane was added to 300 ml distilled water. The mixture was stirred for one hour and brought to pH 7 with cold 27.4% sodium hydroxide. 1 g ammoniumpersulphate and 1 ml N,N,N',N'-tetramethylethylenediamine was added as polymerisation catalysts and stirring was continued until the polymer block was formed. The polymer block was subsequently blended as described in Example 1(b) and "fines" were removed by "inverse sedimentation". In a batch protein binding assay, pH 9, 50 mM TRIS/HCl 1 g of drained wet conglomerate was able to bind 96% of 190 mg offered lysozyme.

(c) Conglomeration of Acrylic Acid/methacrylamide/N,N'-methylenbisacrylamide and Vinyltriethoxysilan Coated Hollow Glass Spheres Following the procedure described in Example 5(b), this ion exchange conglomerate was prepared as by using methacrylamide in exchange for acrylamide. In a batch protein binding assay, pH 9, 50 mM TRIS/HCl, 1 g og the resulting drained wet conglomerate was able to bind 92% of 190 mg offered lysozyme.

(d) Conglomeration of Acrylic Acid/methacrylamide/N,N'methylenbisacrylamide and Vinyltriethoxysilan Coated Hollow Glasss Spheres Following the procedure described in Example 5(c), this ion exchange conglomerate was prepared as by using only 20 ml acrylic acid, 16 g methacrylamide and 4 g N,N'-methylenbisacrylamide, giving the conglomerate a lower dry weight content allowing larger proteins to diffuse in and out of the conglomerate. In a batch protein binding assay, pH 9, 50 mM TRIS/HCl 1 g of conglomerate was able to bind 92% of 190 mg offered lysozyme.

Example 6

Immobilised Enzyme

Immobilization of Glucose Oxidase 10 g divinylsulfon activated agarose conglomerate spheres from Example 2 were, mixed with 20 ml of a solution of glucose oxidase from Aspergillus niger (10 mg/ml in 1 M potassiumhydrogen-phosphate/sodiumhydroxide buffer, pH 10.5). The mixture was left for three hours and the uncoupled glucose oxidase was washed out of the spheres by 1 M sodium chloride.

The enzyme coupled conglomerate spheres showed glucose oxydase activity with glucose as a substrate. The development of hydrogen peroxide was detected as a brown colouring of the gel and solution by coupling the reaction with peroxidase (horse-radish peroxidase) oxidation of orthophenylen diamine.

Example 7

Immobilization of N-acetylglucosamine for the Separation of Wheat Germ Agglutinin Conglomerate spheres containing 4% agarose and produced as described in Example 1 (b) were activated with divinyl sulfon as described in Example 2. 10 g (dried, wet weight) of the activated gel was coupled to N-acetylglucosamine by incubating the gel over night with 20 ml 0.5 M potassiumphosphate/sodiumhydroxide buffer pH 11.5 containing 50 mg N-acetylglycosamine per ml. Following incubation the excess of active vinyl groups were blocked by 5% mercaptoethanol titrated to pH 9.5 by sodium hydroxide. The gel was washed thoroughly with 1 M sodium chloride. The binding capacity for wheat germ agglutinin was larger than 10 mg lectin per ml gel.

Example 8

Purification of Wheat Germ Agglutinin from a Crude Extract 200 ml of low density conglomerated agarose particles derivatized with divinyl sulfone and N-acetylglucosamine as described in Example 7 were used for purification of wheat germ agglutinin from a crude extract. The binding of the lectin was performed as an ordinary batch procedure followed by collection of the conglomerate particles, washing and elution in a specially developed collection vessel 70 shown in FIG. 7.

"Extraction"

A crude extract of wheat germ was prepared a s follows: 1 Kg wheat germ was suspended in 20 liters 0.05 M hydrochloric acid at 4° C.

The suspension was stirred for 4 hours followed by separation of extract from germs by crude filtration through a 400 micrometer nylonfilter. The crude extract (approx. 15 liters) was adjusted to pH 5.0 with 1 M sodium hydroxide.

"Adsorption and Collection of Affinity Matrix"

The low density conglomerate agarose N-acetylglucosamine particles were mixed with the crude extract and incubated with stirring for 2 hours. Following binding of the lectin to the conglomerate particles the extract (containing the particles) was pumped through the inlet valve 71 of the collection vessel 70. The low density conglomerate particles raised continuously to the top 75 of the vessel as they entered through a pipe 72 and were then trapped in the vessel (the valve 73 being closed), while the extract left the vessel through the outlet valve 74.

"Washing"

After collection of the conglomerate particles in the top section 75 of the vessel the vessel and the particles were washed by pumping 0.5 M sodium chloride through the now opened valve 73 in the top and out through the outlet valve 74 in the bottom of the vessel (the valve 71 being closed). Washing was performed with 5 liters of 0.5 M sodium chloride.

"Elution"

Elution of the bound wheat germ agglutinin from the conglomerate particles (still being in the top of the vessel) was performed by pumping ice cold 0.05 M hydrochloric acid into the vessel through valve 74 (arrow in parenthesis) in the bottom, up through the bed of conglomerate particles and out through valve 73 in the top of the vessel 75 (the valve 71 being closed and the particles being retained within the vessel by the coarse filter 76). The eluted lectin was collected in a total volume of 500 ml 0.05 M hydrochloric acid which was neutralized by the addition of 1 M dipotassium phosphate. The yield of purified wheat germ agglutinin was 360 mg.

Purification of wheat germ agglutinin by traditional packed bed chromatography would require extensive filtration and/or centrifugation as a pretreatment to avoid clogging of the column.

Example 9
Waste Water Treatment Using Immobilized Horse-radish Peroxidase

Figure 4B:
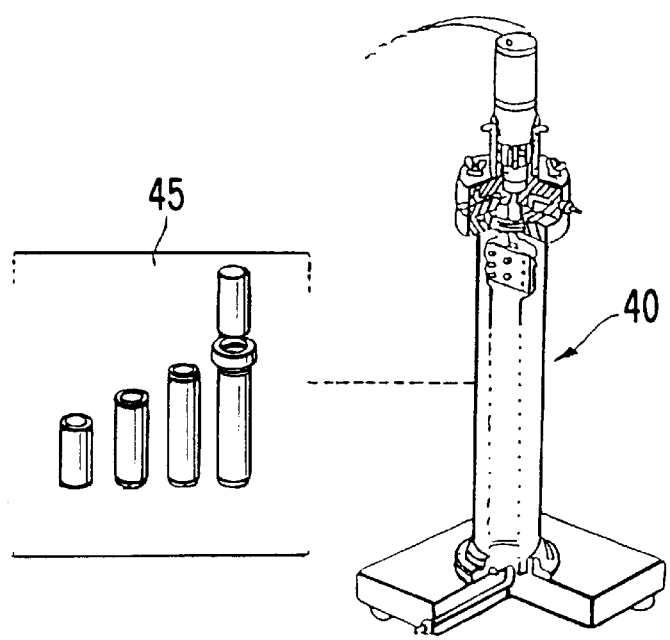

Floating immobilized horse-radish peroxidase particles prepared for described in Example 1(e) were then used in a fluid bed for treatment of industrial waste water containing a range of phenolic amines and chlorophenols. The untreated waste water was added hydrogenperoxide to a concentration of 10 mM, pH was adjusted to 5.5 and the waste water was then pumped through a down flow fluid bed column containing the floating immobilized peroxidase particles stirred proximal to the inlet as shown in FIG. 4. The bed of conglomerate peroxidase particles were divided into a mixed zone in the upper part of the fluid bed (upper 7 cm) and a zone with particles in a stationary fluidized state (lower 20 cm) by stirring with a velocity of 50 rpm and adjusting the linear flow rate of the waste water. The enzymatic oxidation and polymerization of the phenolic compounds caused heavy precipitation in the effluent and after sedimentation of the precipitate, the content of phenolics in the waste water had decreased from about 100 ppm to about 10 ppm.

The heavy precipitation of polymerized phenolic compounds would have made this procedure impossible to perform due to clogging in a traditional packed bed column.

Further more, the use of a stirred fluid bed compared to a nonstirred fluid bed clearly showed less formation of channels through the bed and gave a more complete reaction.

Example 10
Purification of Wastewater from the Fish Industry Using an Ion-exchange Conglomerate Untreated wastewater from a fish fillet factory, containing fish proteins, lipids, mucins and other organic compounds was filtered to remove insoluble matter and adjusted to pH 4.5 with hydrochloric acid.

In order to remove the organic contaminants, a 50 liter sample of the wastewater was incubated with 2.5 liters of an acrylic acid copolymeric ion-exchange conglomerate prepared according to Example 5(d) for 2 hours. The incubation was performed as a batch procedure and the conglomerate ion-exchanger was separated from the treated wastewater by pumping it through a collecting vessel as described in Example 8 (FIG. 7).

A significant decrease in the content of organic matter after the treatment was evident from measurements of BOD. BOD values lower than 175 mg/l were obtained.

Further more, the ionexchange conglomerate became colored during the treatment from a white colour to a red-brownish colour.

Example 11
(a) High Density Acrylic Acid Copolymer Solid Glass Sphere Conglomerated Particles To 300 ml destined water was added 40 ml acrylic acid, 28 g acrylamide, 12 g N,N'-methylenbisacrylamide, 5 ml vinyl-triethoxysilane and 245 g solid glass spheres (0.075–0.15 mm, Fryma, Switzerland). The suspension was stirred for one hour and then adjusted to pH 7 with cold 27.4% sodium hydroxide. 1 g ammoniumpersulfate and 1 ml N,N,N',N'-tetramethylethylendiamine was added as polymerization catalysts and the stirring was continued until a polymer block was formed. The polymer block was subsequently disintegrated in a blender followed by repeated sedimentation to remove fines. This procedure gave about 800 ml conglomerated particles with a density of 1.3 g/ml. In a batch protein binding assay (50 mM Tris/HCl pH 9.0) 1 g of wet but drained conglomerated particles was able to bind 61% of 190 mg offered lysozyme from hens egg white.

Selected particles of these conglomerated particles having only one basic particle are shown in FIG. 1C.

(b) High Density Gelatin Solid Glass Sphere Conglomerated Particles

Four samples of 100 ml 5% gelatin in 0.15 M sodium chloride (35° C.) were added solid glass spheres (0.075–15 mm, Fryma, Switzerland) with a density of 2.5 g/ml in increasing amounts:

A: 10 g
B: 50 g
C: 100 g
D: 200 g

After adjustment of pH to 5.5 all samples were added 2.0 ml glutaric dialdehyde (25% solution, Cat. No.: 820603, Merck) under thorough stirring. After 24 hours of incubation at room temperature the polymerized matrices were disintegrated in a blender. The resulting particles were separated from fines by sedimentation. The particles were then collected on a glass filter and drained for excess water by vacuum suction on the glass filter.

The wet but drained particles were then weighed and the particle volume determined by adding a known amount of liquid followed by determination of the total volume. The following particle densities were obtained:

|    | Measured Density: | Calculated Density: |
| --- | --- | --- |
| A: | 1.1 g/ml | 1.06 g/ml |
| B: | 1.3 g/ml | 1.25 g/ml |
| C: | 1.5 g/ml | 1.43 g/ml |
| D: | 1.7 g/ml | 1.67 g/ml |

We claim:

1. A method of distributing a liquid in the fluid bed of a down-flow fluid bed reactor having a vertical reactor with a liquid inlet, a liquid outlet spaced from said inlet, and fluid bed particles suspended in the liquid, which method comprises:

a) agitating the suspended fluid bed particles and liquid proximal to the liquid inlet so as to divide the suspended fluid bed particles into i) a turbulent zone proximal to the liquid inlet in an uppermost part of said fluid bed, said turbulent zone having vigorously moving fluid bed particles, and ii) a non-turbulent zone distal to the liquid inlet, said non-turbulent zone adjoining said turbulent zone and having essentially stationary fluidized particles; and wherein the downward extent of the turbulent zone proximal to the liquid inlet is determined by the degree of said agitating.

2. The method according to claim 1, wherein the fluid bed particles in the turbulent zone are different from those in the non-turbulent zone.

3. The method according to claim 2, wherein the fluid bed particles in the turbulent zone are inert particles of a different specific gravity than the particles of the non-turbulent zone.

4. The method of claim 1, wherein the fluid bed particles comprise an active substance selected from the group consisting of:

ligands, charged species for ion exchange chromatography, proteins, dyes, enzyme inhibitors, biotin for purification of avidin and biotin binding proteins, carbohydrates for purification of lectins or glycosidases, protein A, chelates, iminodiacetic acid, amino acids, arginine, lysine, and histidine, sulfated polymers, heparins, benzhydroxamic acid, hydrocarbon groups, divinyl sulfone activated substances coupled with mercaptoethanol, 4-hydroxypyridine, 3-hydroxy-pyridine, or 2-hydroxy-pyridine; natural and synthetic polynucleotides and nucleic acids;

carbohydrate based polymers selected from the group consisting of, agar, alginate, carrageenan, guar gum, gum arabic, gum ghatti, gum tragacanth, karaya gum, locust bean gum, xanthan gum, agaroses, celluloses, pectins, mucins, dextrans, starches and heparins;

amino acid based polymers selected from the group consisting of gelatins, albumins, hemoglobulins, immunoglobulins including poly- and mono clonal antibodies, antigenes, protein G, lectins, glycoproteins, biotin binding proteins, avidin and streptavidin, enzymes, proteases, protease inhibitors;

microorganisms and virus particles; and mixtures of the above.

5. A method of distributing a liquid in the fluid bed of an up-flow fluid reactor comprising a vertical reactor with a liquid inlet, a liquid outlet spaced from said inlet, and fluid bed particles suspended in the liquid, which method comprises:

a) agitating the suspended fluid bed particles and liquid proximal to the liquid inlet so as to divide the suspended fluid bed particles into
i) a turbulent zone proximal to the liquid inlet in a lowermost part of said fluid bed, said turbulent zone having vigorously moving particles, and
ii) a non-turbulent zone distal to the liquid inlet, said non-turbulent zone adjoining said turbulent zone and having essentially stationary fluidized particles; and wherein the upward extent of the turbulent zone proximal to the liquid inlet is determined by the degree of said agitating.

6. The method according to claim 5, wherein the fluid bed particles in the turbulent zone are different from those in the non-turbulent zone.

7. The method according to claim 6, wherein the fluid bed particles of the turbulent zone are inert particles of different specific gravity than the particles of the non-turbulent zone.

8. The method as claimed in claim 1 or 5, wherein the fluid bed particles comprise particles of a conglomerate formed of:

a) density controlling particles selected from the group consisting of low density particles providing floatation of the fluid bed particles in the liquid, high density particles providing sedimentation of the fluid bed particles in the liquid, and mixtures thereof; and b) a matrix formed by consolidating at least one conglomerating agent;

said density controlling particles being dispersed in said matrix.

9. The method of claim 8, wherein the fluid bed particle size range is controlled; and the fluid bed particle density and said size range are selected to provide desired floatation/sedimentation properties of said fluid bed particles in the liquid.

10. The method of claim 8, wherein there is more than one type of density controlling particle in the fluid bed particles.

11. The method of claim 8, wherein said density controlling particles are impermeable to the liquid.

12. The method of claim 8, wherein the low density particles are hollow.

13. The method of claim 8, wherein the high density particles are solid.

14. The method of claim 8, wherein the density controlling particles constitute from 1 to 95% by volume of the fluid bed particles.

15. The method of claim 8, wherein the low density particles consist of hollow plastic particles, or unicellar glass micro spheres.

16. The method of claim 8, wherein the high density particles consist of glass particles.

17. The method of claim 8, wherein the relative density of said fluid bed particles with respect to said liquid is from 0.1 to 15.

18. The method of claim 17, wherein the relative density is from 1.1 to 5.

19. The method of claim 17, wherein the relative density is from 0.1 to 1.

20. The method of claim 8, wherein the size of the fluid bed particles is within the range of 1–10000 $\mu$m.

21. The method of claim 20, wherein the liquid contains a protein or a high molecular weight substance to be purified, and the size of the fluid bed particles is within the range of 1–2,000 $\mu$m.

22. The method of claim 20, wherein the liquid contains an enzyme to be immobilized, and wherein the size of the fluid bed particles is within the range of 10–10000 $\mu$m.

23. The method of claim 20, wherein the liquid contains a microorganism to be immobilized, and wherein the fluid bed particle size is within the range of 0.5–50 mm.

* * * * *